United States Patent
Taheri et al.

(10) Patent No.: US 9,756,118 B2
(45) Date of Patent: *Sep. 5, 2017

(54) VIRTUAL PERFORMANCE MONITORING DECOUPLED FROM HARDWARE PERFORMANCE-MONITORING UNITS

(71) Applicant: VMware, Inc., Palo Alto, CA (US)

(72) Inventors: Reza Taheri, Palo Alto, CA (US); Kalyan Saladi, Palo Alto, CA (US); Daniel Michael Hecht, Palo Alto, CA (US); Jin Heo, Palo Alto, CA (US); Jeffrey Buell, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 14/263,640

(22) Filed: Apr. 28, 2014

(65) Prior Publication Data
US 2015/0312116 A1 Oct. 29, 2015

(51) Int. Cl.
*G06F 9/455* (2006.01)
*H04L 29/08* (2006.01)
*H04L 12/26* (2006.01)

(52) U.S. Cl.
CPC .............. *H04L 67/10* (2013.01); *H04L 43/00* (2013.01); *H04L 67/1097* (2013.01)

(58) Field of Classification Search
CPC .................................................. H04L 67/10
USPC .......................................................... 718/1
See application file for complete search history.

(56) References Cited

U.S. PATENT DOCUMENTS

| | | | | |
|---|---|---|---|---|
| 8,230,059 B1* | 7/2012 | Santos | ................. | G06F 11/301 709/224 |
| 2008/0155536 A1* | 6/2008 | Levit-Gurevich | .... | G06F 9/4843 718/1 |

OTHER PUBLICATIONS

Benjamin Serebrin et al., "Virtualizing Performance Counters", Springer-Verlag Berlin Heidlberg, 2012, pp. 223-233.*

* cited by examiner

*Primary Examiner* — Wei Zhen
*Assistant Examiner* — Lanny Ung

(57) ABSTRACT

The current document is directed to virtualized PMUs provided by virtualization layers. The currently disclosed virtualized PMUs are decoupled from the underlying PMU hardware features of processors on which the virtualization layer executes. The decoupling is achieved, in part, by time multiplexing the underlying hardware PMU registers to provide a greater number of virtualized PMU registers than the number of hardware-PMU registers provided by at least some of the underlying hardware PMUs. The decoupling is also achieved by providing for monitoring, by the virtualized PMU registers, of computed processor events and approximated processor events in addition to the processor events monitored by the underlying hardware PMUs. In addition, the virtualized PMU registers are implemented, in certain implementations, to support a variety of different monitoring modes, including monitoring of processor events that occur only during execution of the virtualization layer and monitoring of hardware-thread-specific processor events.

20 Claims, 34 Drawing Sheets

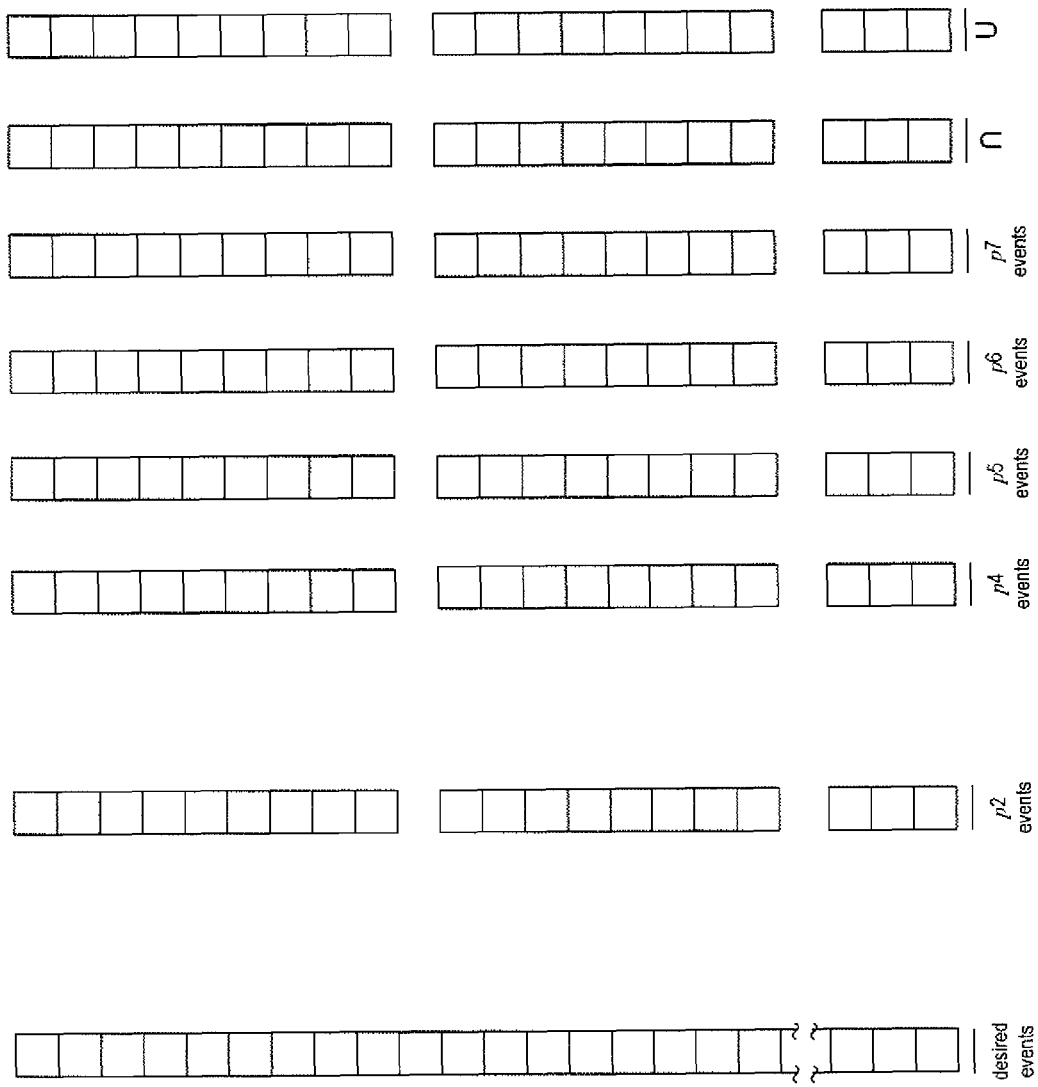

VIRTUAL PERFORMANCE MONITORING DECOUPLED FROM HARDWARE PERFORMANCE-MONITORING UNITS

TECHNICAL FIELD

The current document is directed to virtualization of computer hardware and hardware-based performance monitoring and, in particular, to a virtualized performance-monitoring unit decoupled from underlying hardware features.

BACKGROUND

Performance monitoring is an integral aspect of computational-system development. Modern computational systems are extremely complex electro-optico-mechanical systems with thousands of individual components, many including integrated circuits that may each include millions of submicroscale active and passive electronic subcomponents. To manage this complexity, modern computational systems feature many layers of hierarchical control and organization, from low-level hardware controllers and control circuits all the way up to complex control components and subsystems, including firmware controllers and computer-instruction-implemented subsystems, including virtualization layers, operating systems, and application programs, often comprising millions, tens of millions, or more computer instructions compiled from complex computer programs. In general, there are an essentially limitless different number of ways in which these control subsystems can be implemented and deployed to provide any number of different sets of features and operational behaviors. In many cases, even small changes in the sequence of computer-instruction execution can lead to large changes in the computational efficiency, accuracy and robustness, and latencies associated with the complex computational systems.

While careful design and implementation of the many different layers of control systems and organizations of components within complex computational systems can lead to reasonable levels of performance, it is often not possible, because of the complexity of the hierarchical levels of control and organization, and the unpredictable nature of workloads, to anticipate the various problems and pitfalls that arise when the hierarchical levels of control and organization are deployed in a physical system. As a result, many thousands, hundreds of thousands, or more man hours of tuning, partial redesign, and optimization are often needed to achieve desired performance levels. These activities are all based on various types of performance-monitoring efforts that are used to monitor and evaluate operation of the complex computational systems. Performance monitoring is also generally hierarchically structured, from high-level benchmark tests that measure the efficiency and throughput of the computational systems as they execute high-level tests to highly specific, targeted testing of small subassemblies of components and individual routines within complex control programs.

In the past decades, computer processors have been enhanced with performance-monitoring units ("PMUs") that allow various types of events and operational activities that occur during processor operation to be counted over defined time intervals. The performance-monitoring units generally comprise register-and-instruction interfaces to underlying event-monitoring hardware features. The type of low-level performance monitoring provided by PMUs can often reveal inefficiencies and deficiencies in the design and operation of higher-level control systems, including virtualization layers and operating systems. Unfortunately, the performance-monitoring units ("PMUs") are generally processor-type and even processor-model specific, with great variations in the interface to, and capabilities of, the many different types of PMUs. As a result, use of PMUs may require complex, system-specific development of higher-level performance-monitoring tools based on the specific PMUs within a system. Even more problematic is the fact that, in modern complex computational systems, computational tasks, including processes and threads, may often move among many different types of individual systems with different types of processors during execution of high-level tasks, such as benchmark computing tasks. As a result, it is a significant challenge to attempt to use the capabilities of various different PMUs within complex computational systems that feature virtualization layers. For these and many other reasons, designers and developers of complex computational systems and program-implemented control systems that execute within them continue to seek new methods for accessing the capabilities of processor-embedded PMUs.

SUMMARY

The current document is directed to virtualized PMUs provided by virtualization layers. The currently disclosed virtualized PMUs are decoupled from the underlying PMU hardware features of processors on which the virtualization layer executes. The decoupling is achieved, in part, by time multiplexing the underlying hardware PMU registers to provide a greater number of virtualized PMU registers than the number of hardware-PMU registers provided by at least some of the underlying hardware PMUs. The decoupling is also achieved by providing for monitoring, by the virtualized PMU registers, of computed processor events and approximated processor events in addition to the processor events monitored by the underlying hardware PMUs. In addition, the virtualized PMU registers are implemented, in certain implementations, to support a variety of different monitoring modes, including monitoring of processor events that occur only during execution of the virtualization layer and monitoring of hardware-thread-specific processor events.

BRIEF DESCRIPTION OF THE DRAWINGS

In FIG. 9, three different physical data centers 902-904 are shown below planes representing the cloud-director layer of abstraction 906-908.

FIGS. 22A-D illustrate a computed-register method that represents one method used to implement hardware-decoupled virtualized PMUs.

DETAILED DESCRIPTION OF EMBODIMENTS

Figure 1:
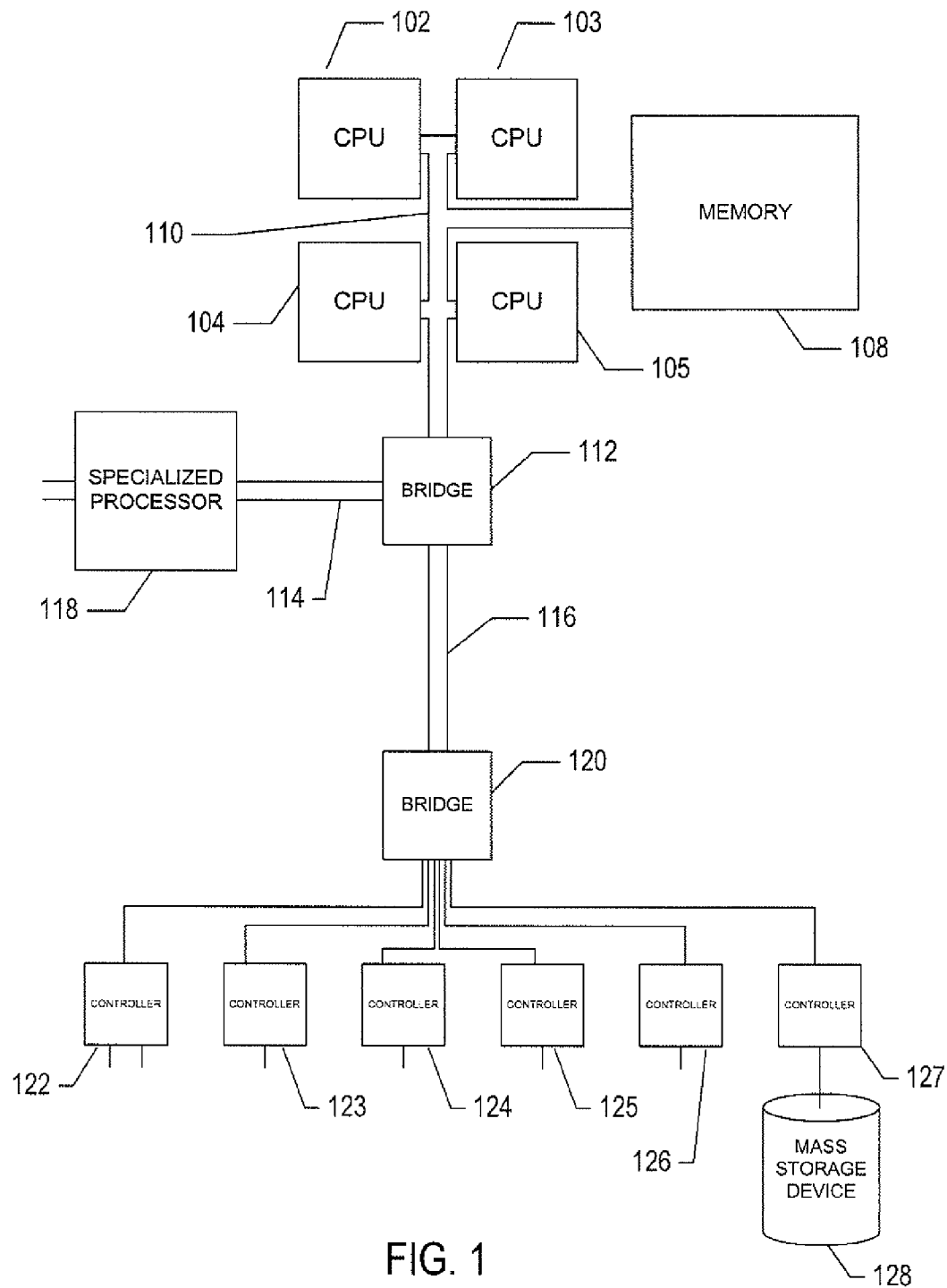
FIG. 1 provides a general architectural diagram for various types of computers.

The current document is directed to hardware-decoupled virtual performance monitoring units provided by virtualization layers to guest operating systems and, in certain implementations, higher-level application programs. These virtualized PMUs may, in addition, be used internally within a virtualization layer to monitor virtualization-layer performance, execution performance dependencies on assignment of virtual machines to hardware processors and hardware systems, and for monitoring many additional aspects of virtualized computer systems. In a first subsection, below, a detailed description of computer hardware, complex computational systems, and virtualization is provided with reference to FIGS. 1-18. In a second subsection, the implementations of the currently disclosed hardware-decoupled virtualized PMUs are disclosed.

Computer Hardware, Complex Computational Systems, and Virtualization

The tech "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
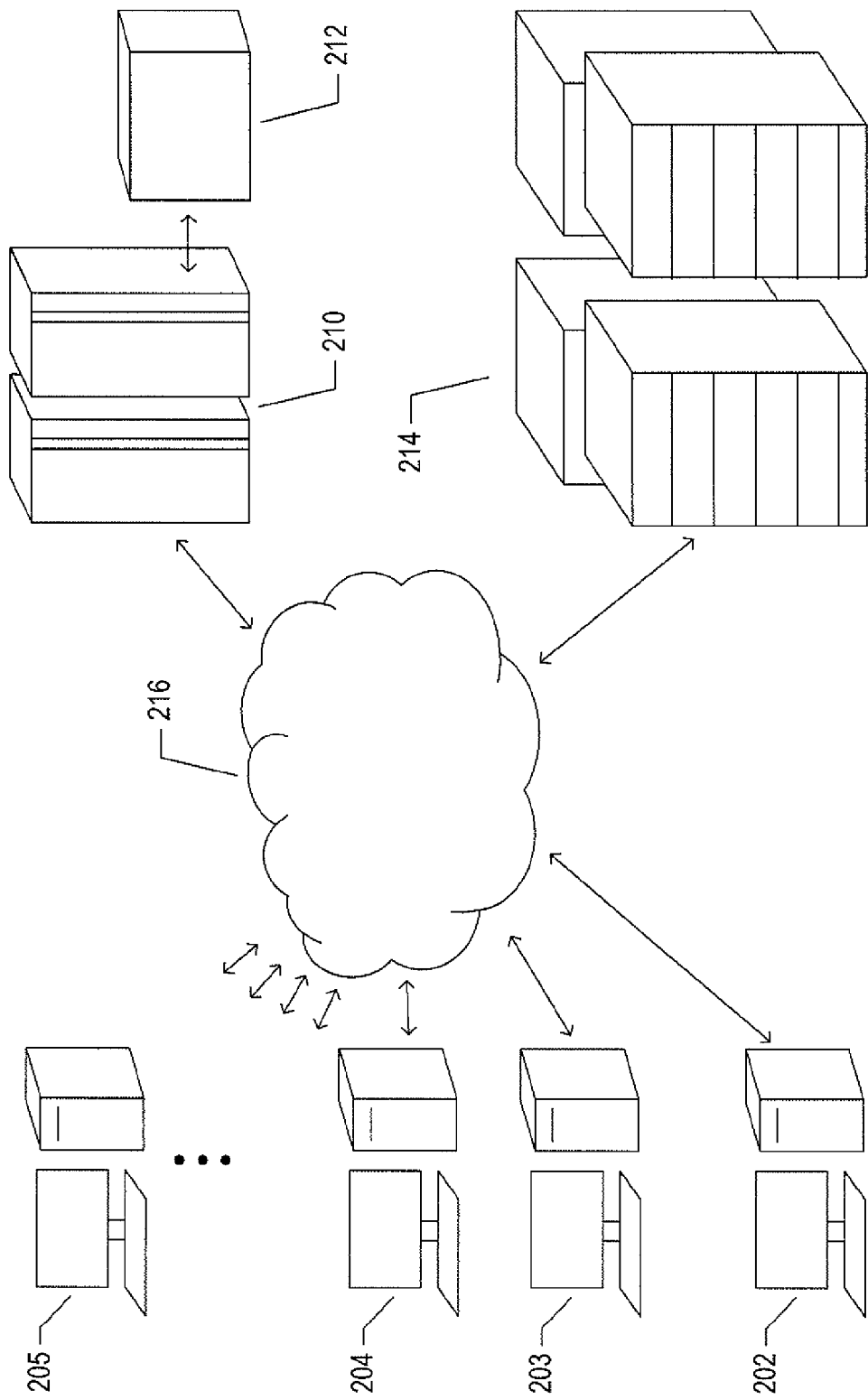
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
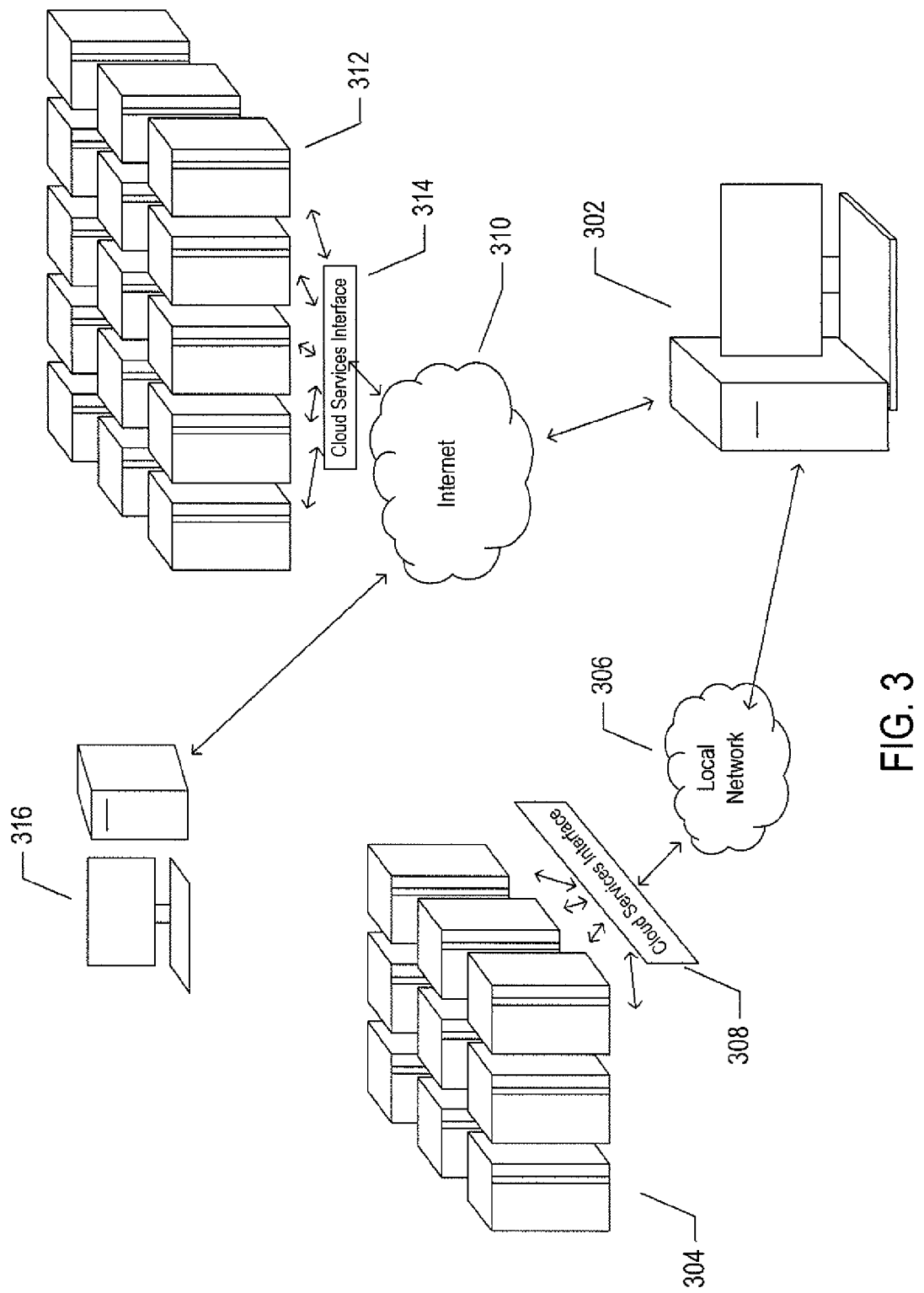
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
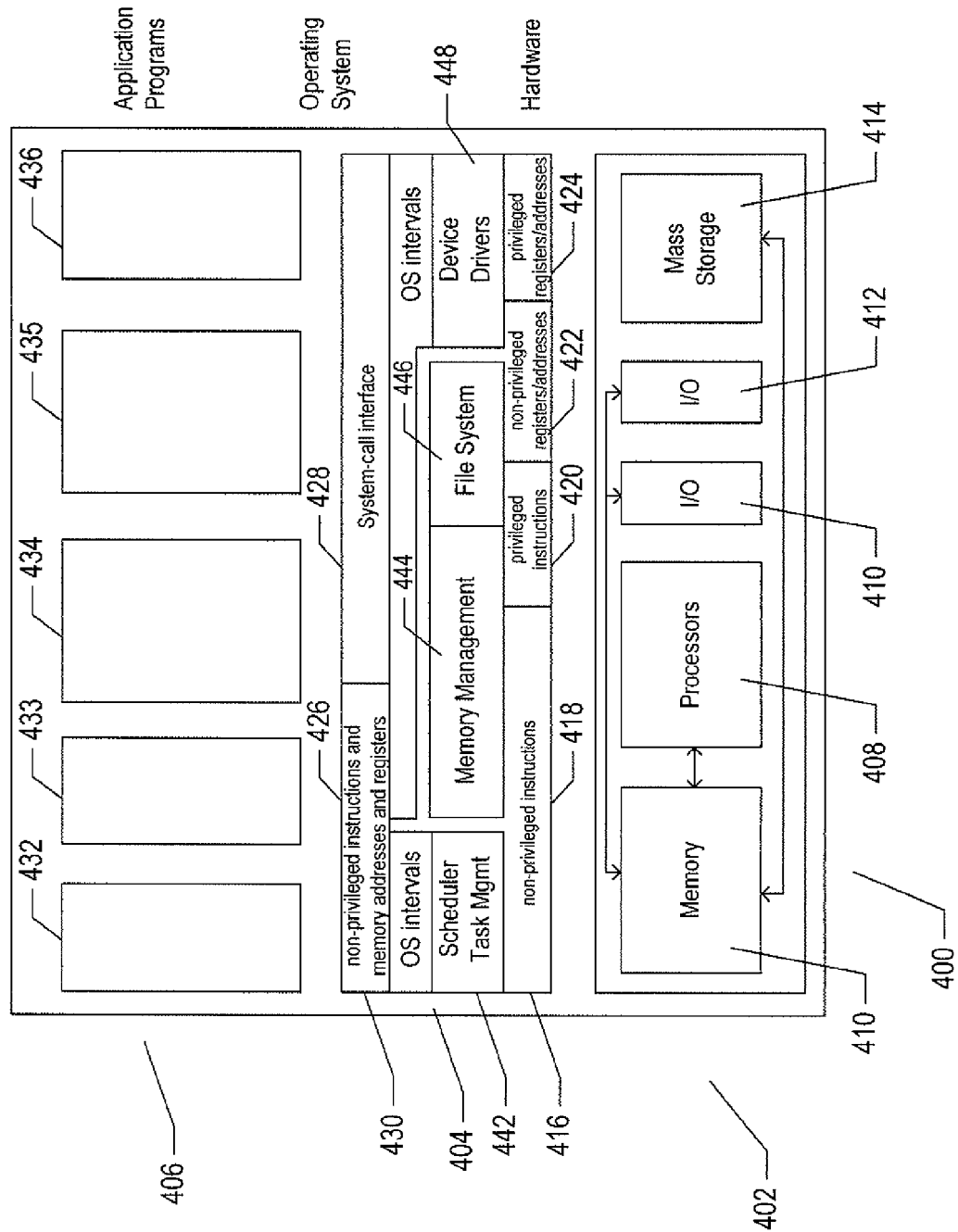
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
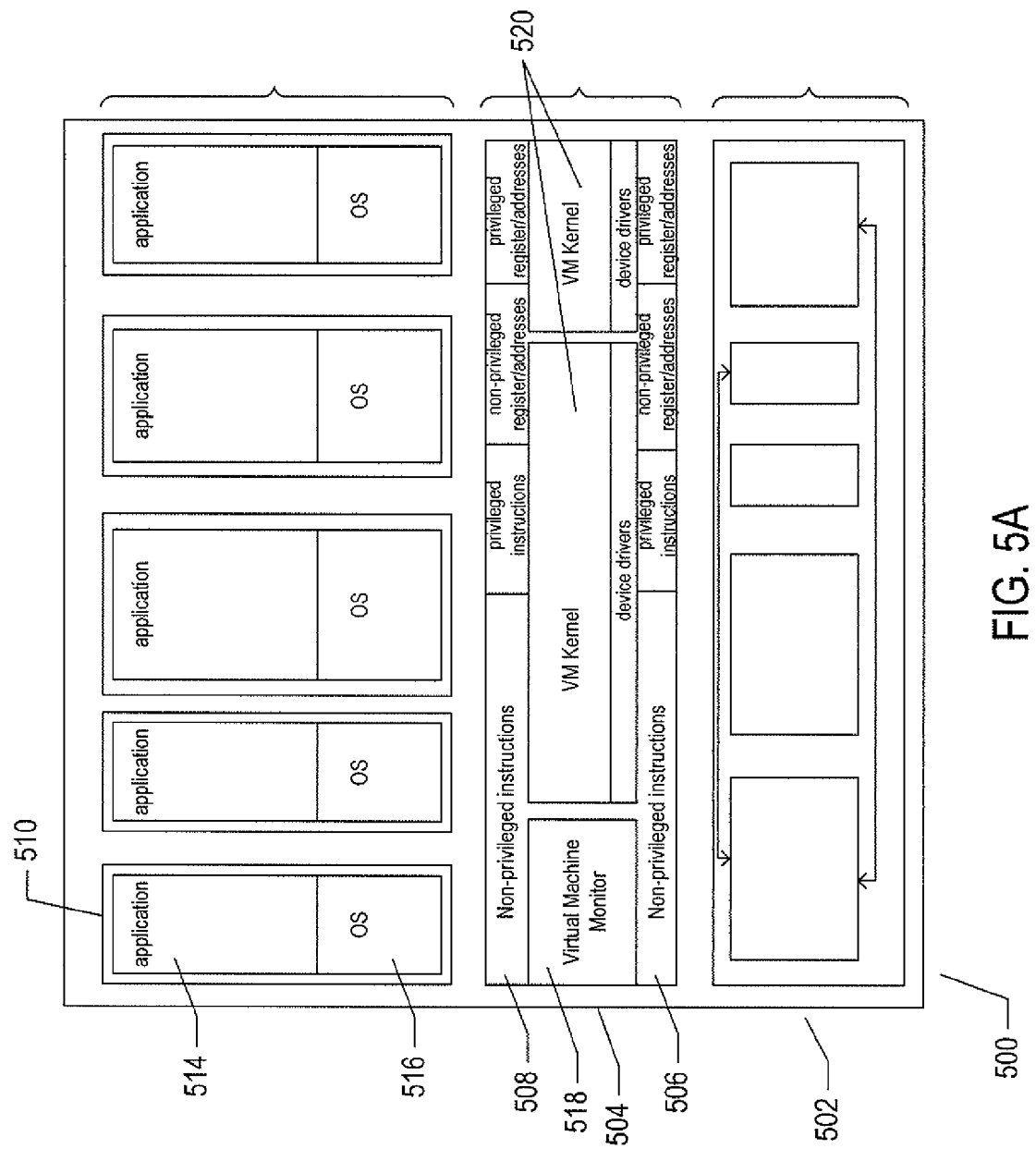
FIGS. 5A-B illustrate two types of virtual machine and virtual-machine execution environments.
Figure 5B:
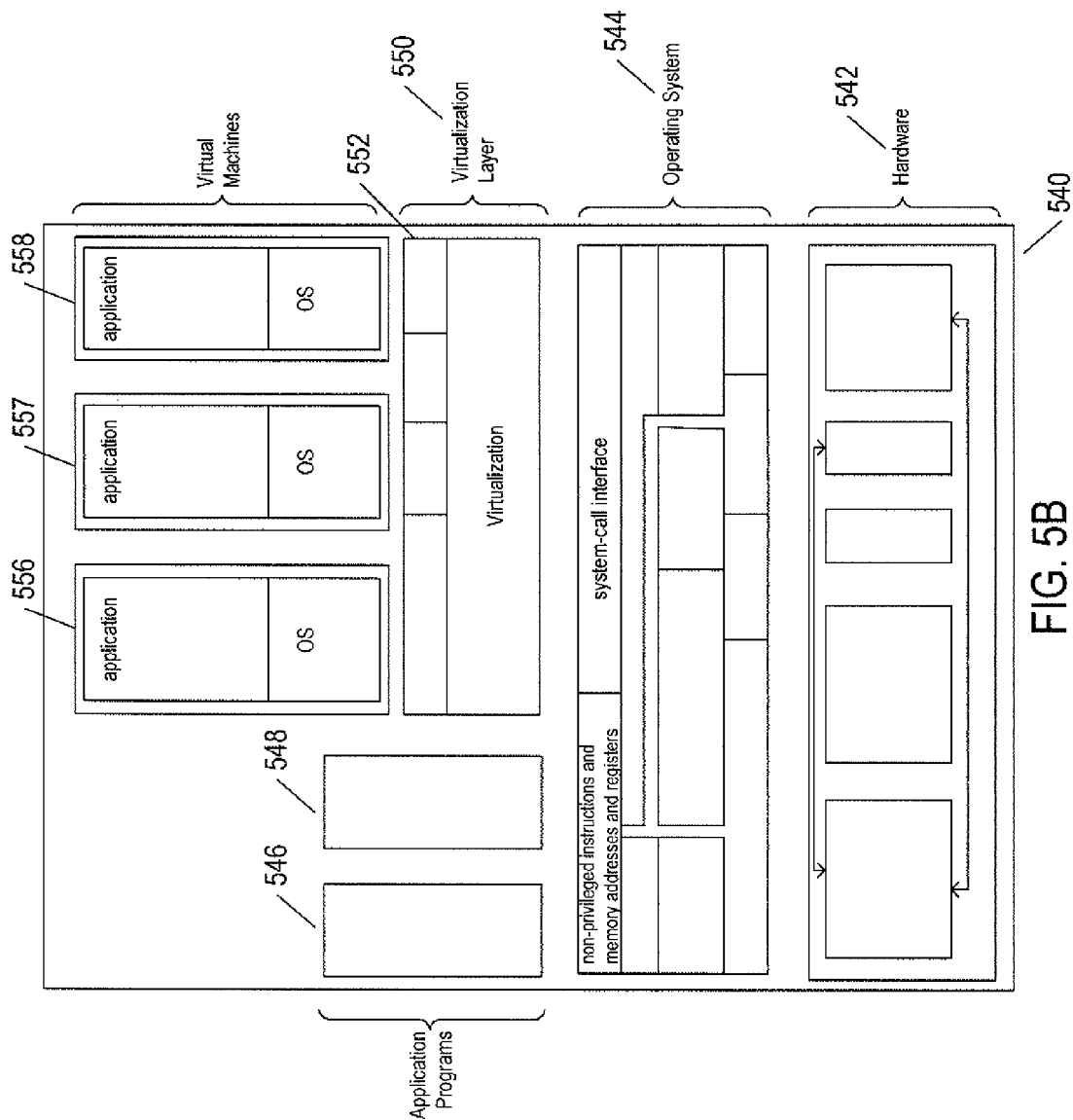

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
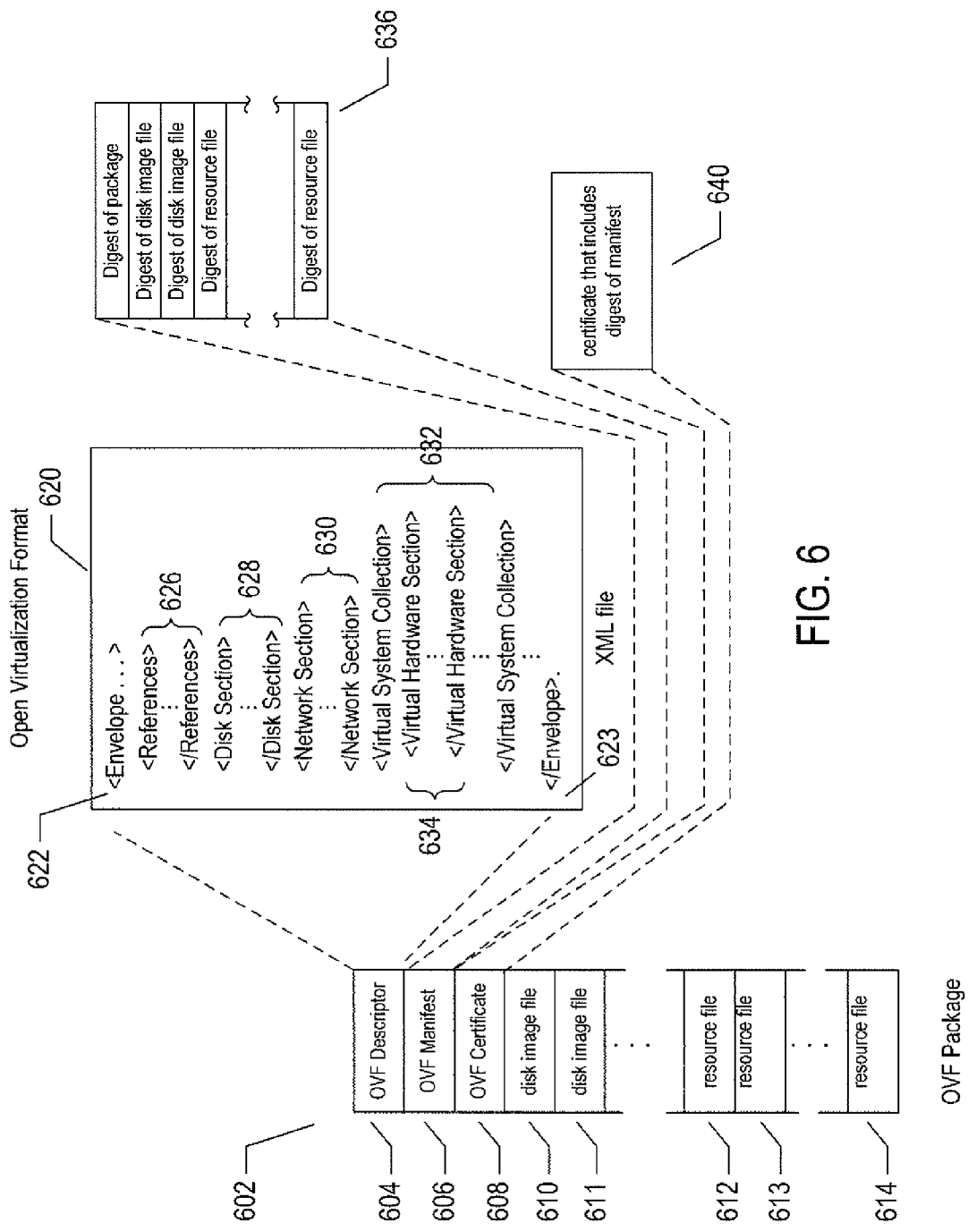
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
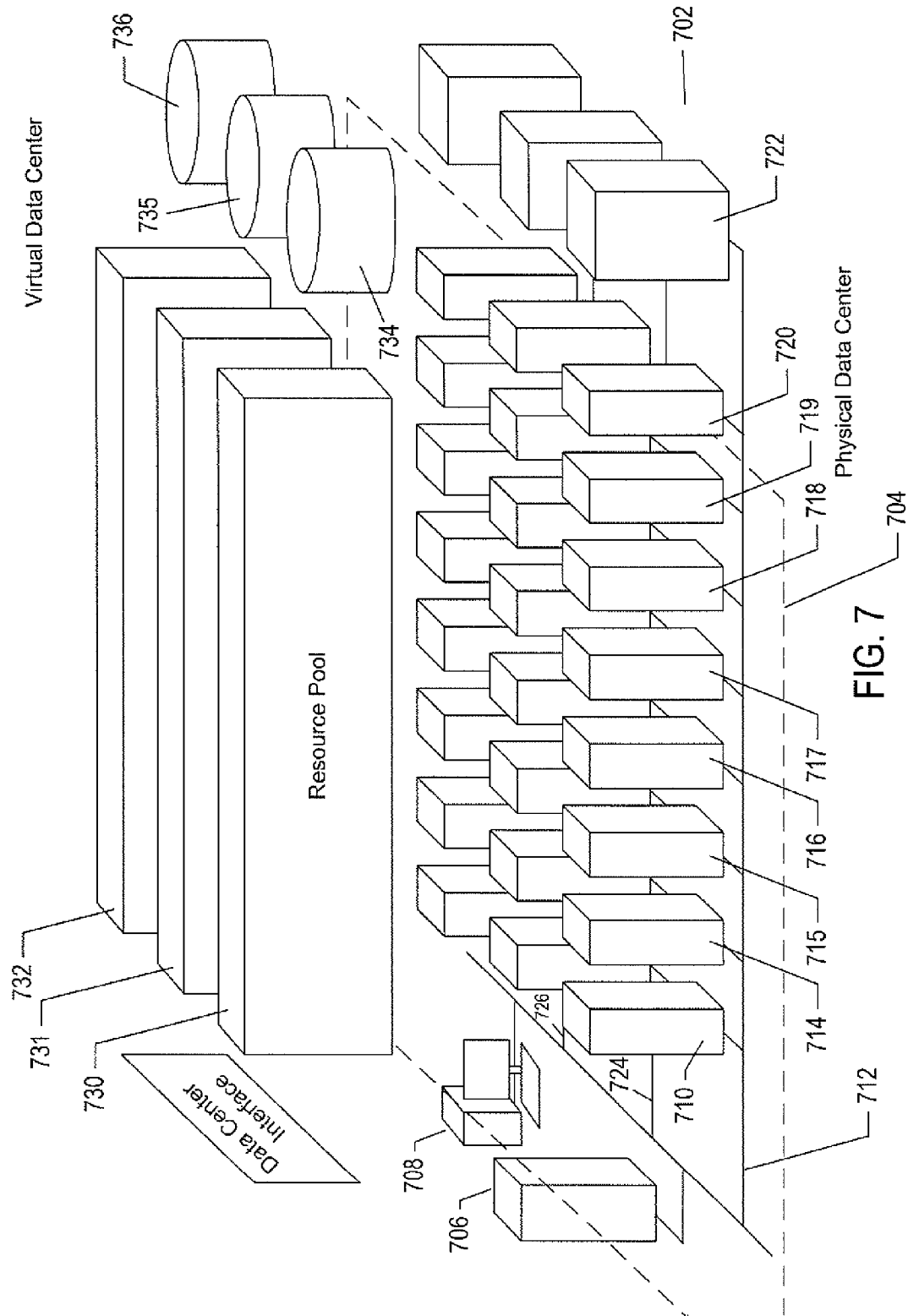
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers miming on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
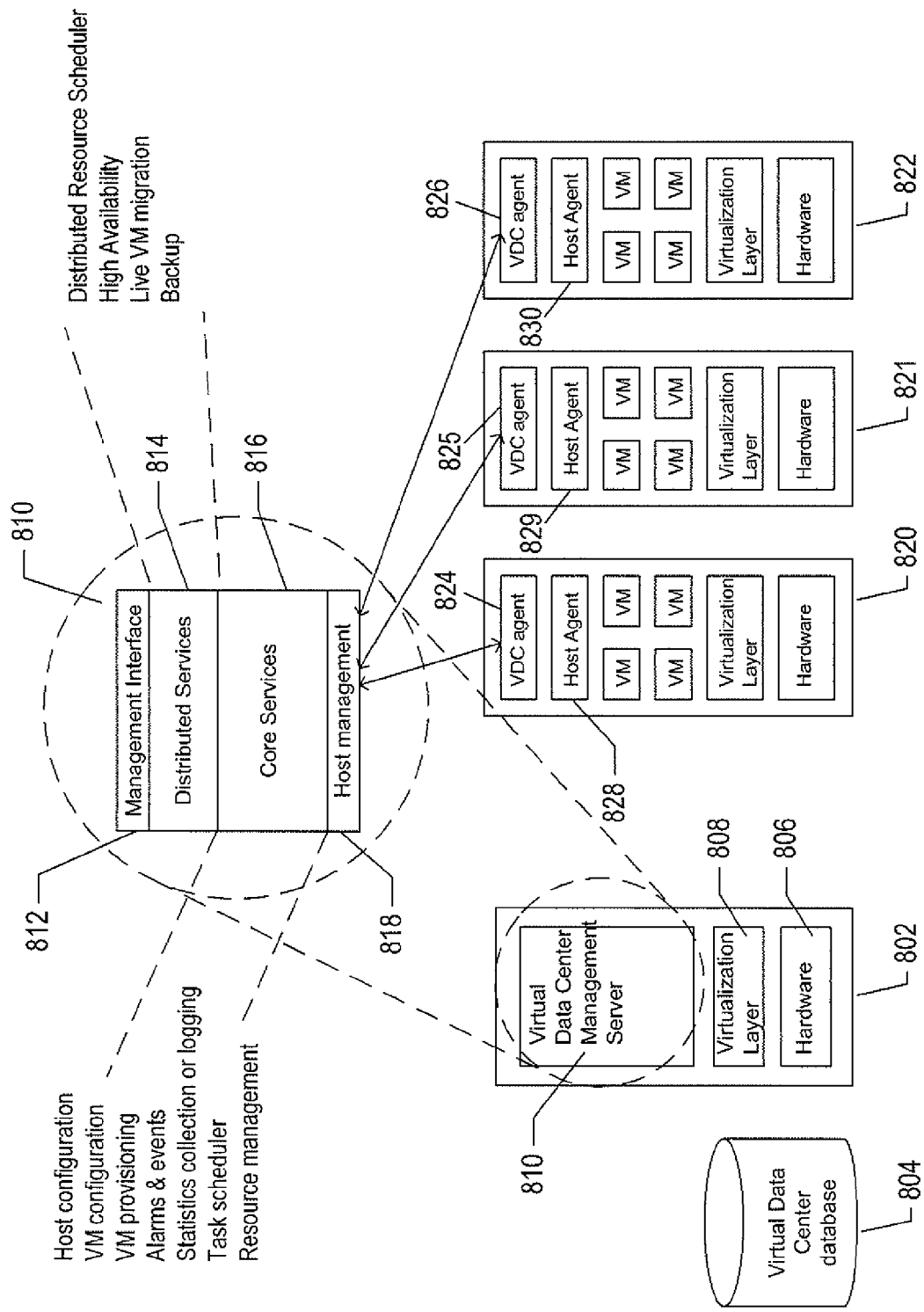
FIG. 8 illustrates virtual-machine components of a virtual-data-center management server and physical servers of a physical data center above which a virtual-data-center interface is provided by the virtual-data-center management server.

FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
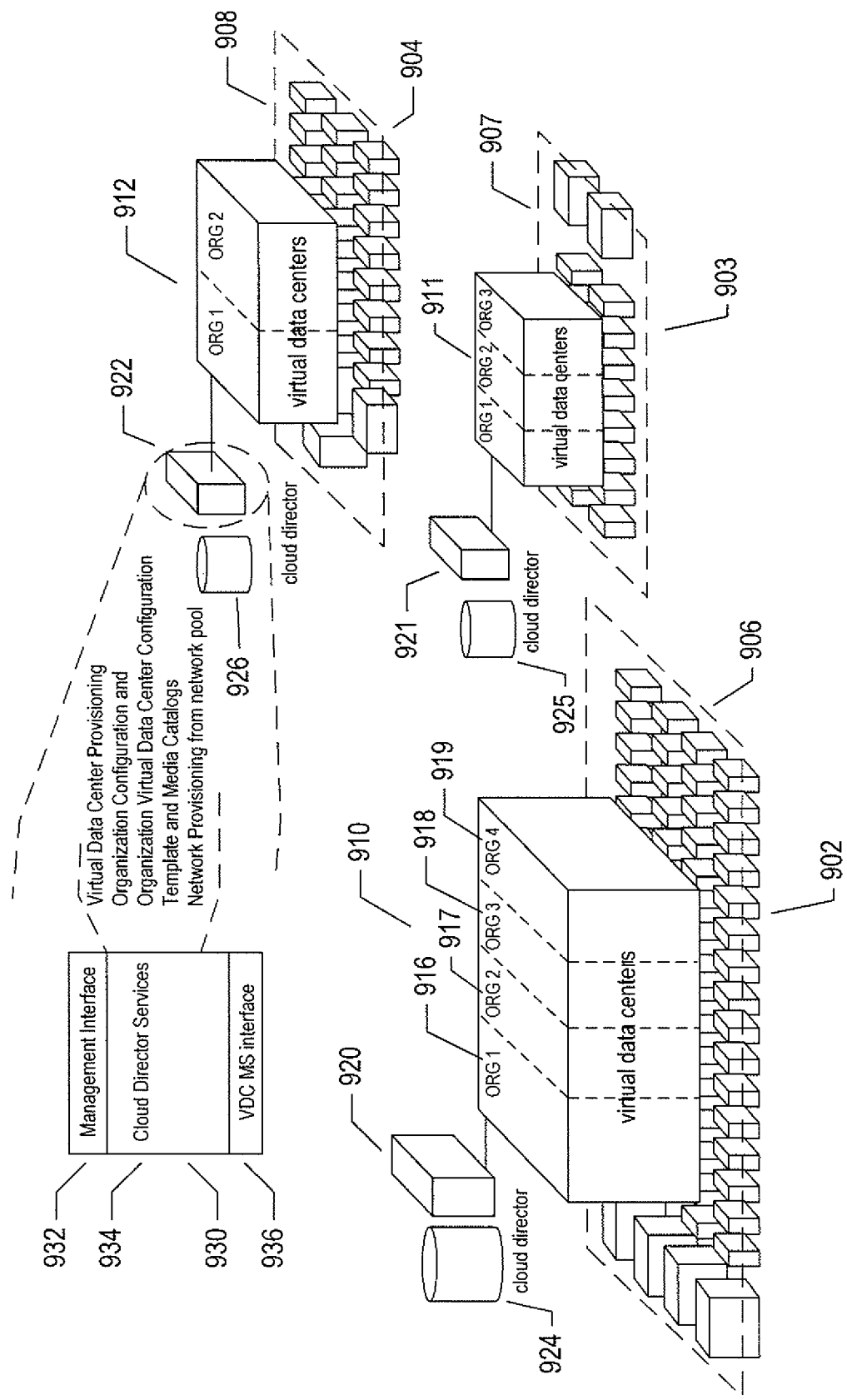
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
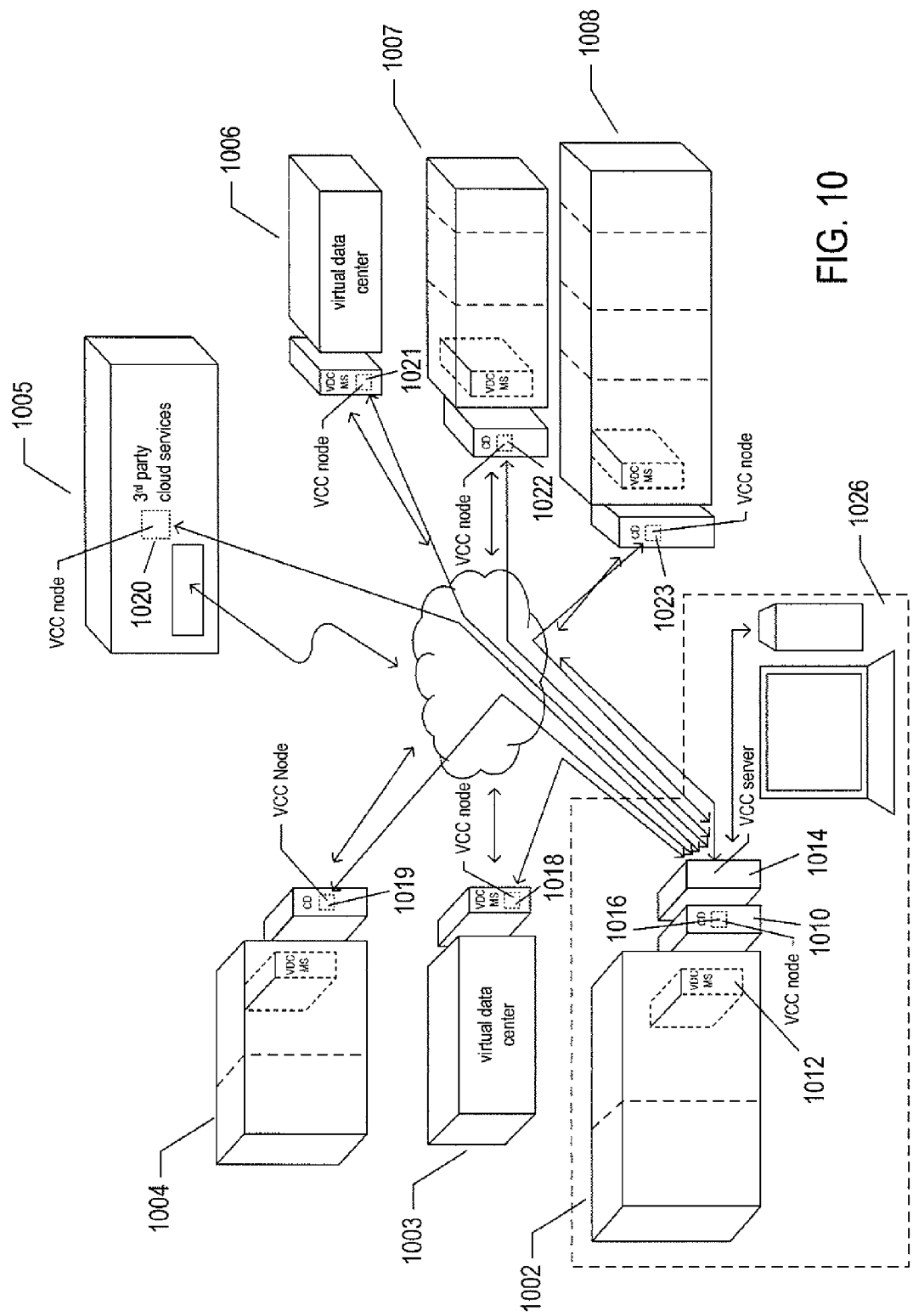
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
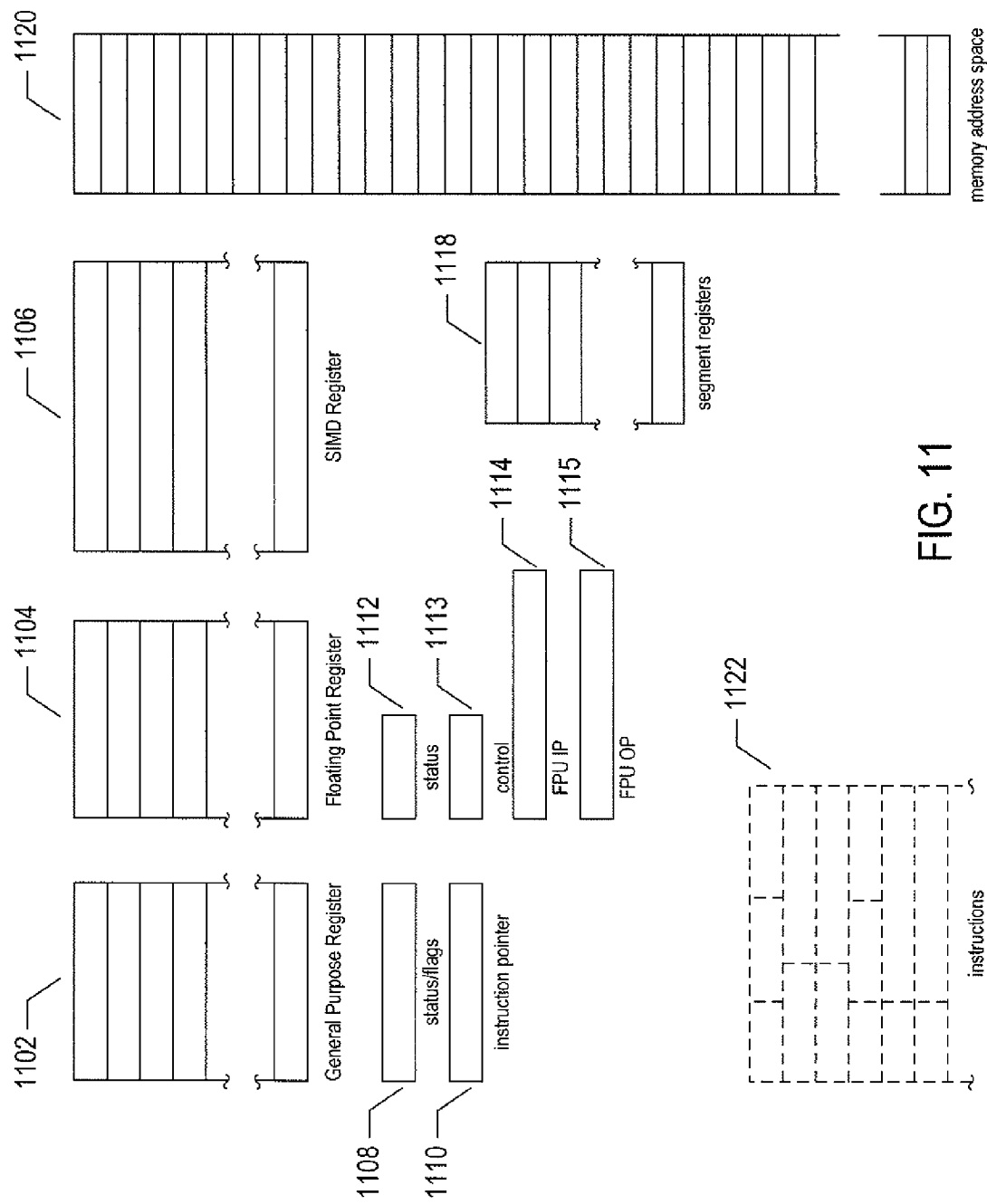
FIG. 11 illustrates an instruction-set architecture ("ISA") provided by a modern processor as the low-level execution environment for binary code and assembler code.

FIG. 11 illustrates an instruction-set architecture ("ISA") provided by a modern processor as the low-level execution environment for binary code and assembler code. The ISA commonly includes a set of general-purpose registers 1102, a set of floating-point registers 1104, a set of single-instruction-multiple-data ("SIMD") registers 1106, a status/flags register 1108, an instruction pointer 1110, special status 1112, control 1113, and instruction-pointer 1114 and operand 1115 registers for floating-point instruction execution, segment registers 1118 for segment-based addressing, a linear virtual-memory address space 1120, and the definitions and specifications of the various types of instructions that can be executed by the processor 1122. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 12:
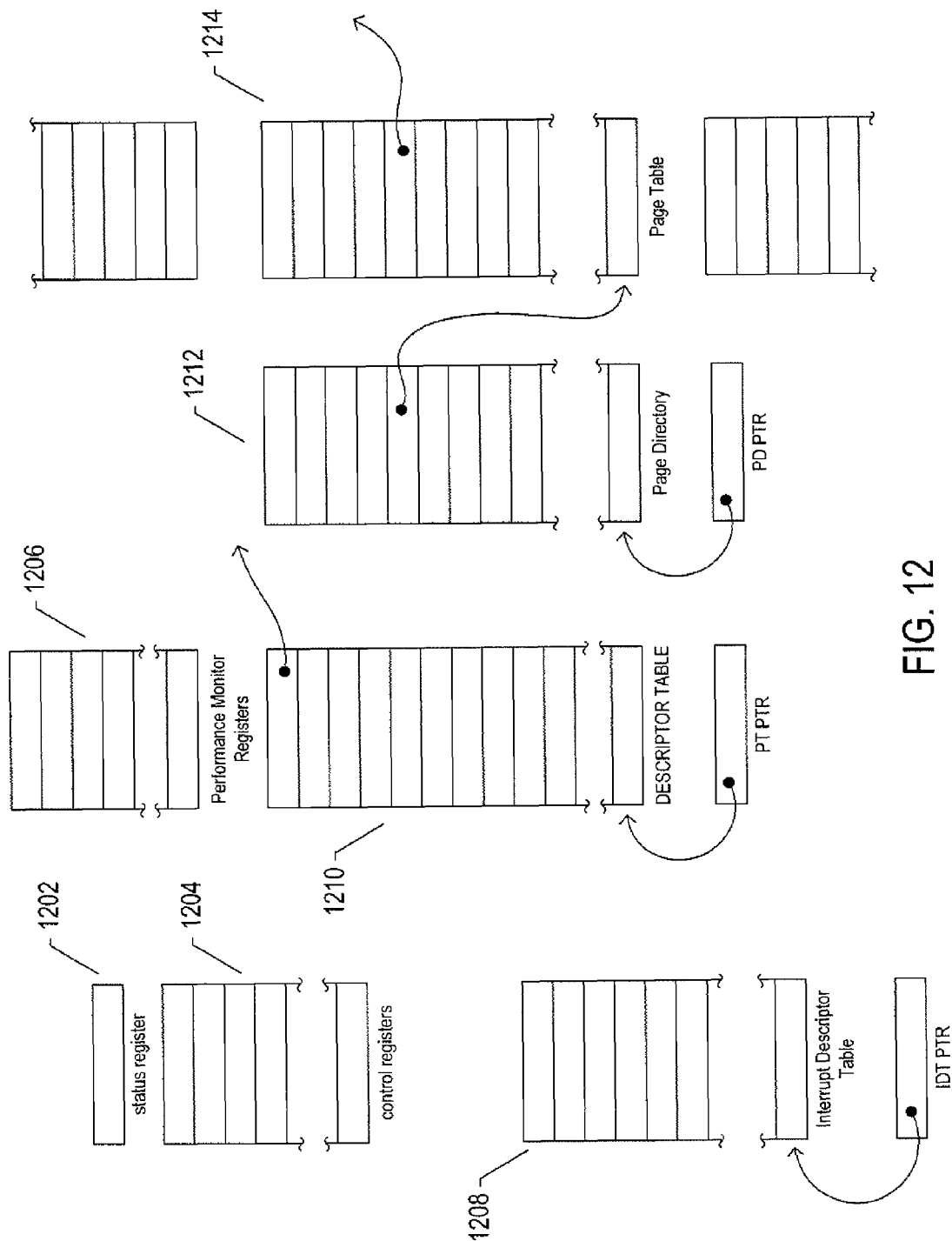
FIG. 12 illustrates an additional abstraction of processor features and resources used by virtual-machine monitors, operating systems, and other privileged control programs.

FIG. 12 illustrates an additional abstraction of processor features and resources used by virtual-machine monitors, operating systems, and other privileged control programs. These processor features, or hardware resources, can generally be accessed only by control programs operating at higher levels than the privilege level at which application programs execute. These system resources include an additional status register 1202, a set of additional control registers 1204, a set of performance-monitoring registers 1206, an interrupt-descriptor table 1208 that stores descriptions of entry points for interrupt handlers, the descriptions including references to memory descriptors stored in a descriptor table 1210. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 1212 that contains entries pointing to page tables, such as page table 1214, each of which, in turn, contains a physical memory address of a virtual-memory page.

Figure 13:
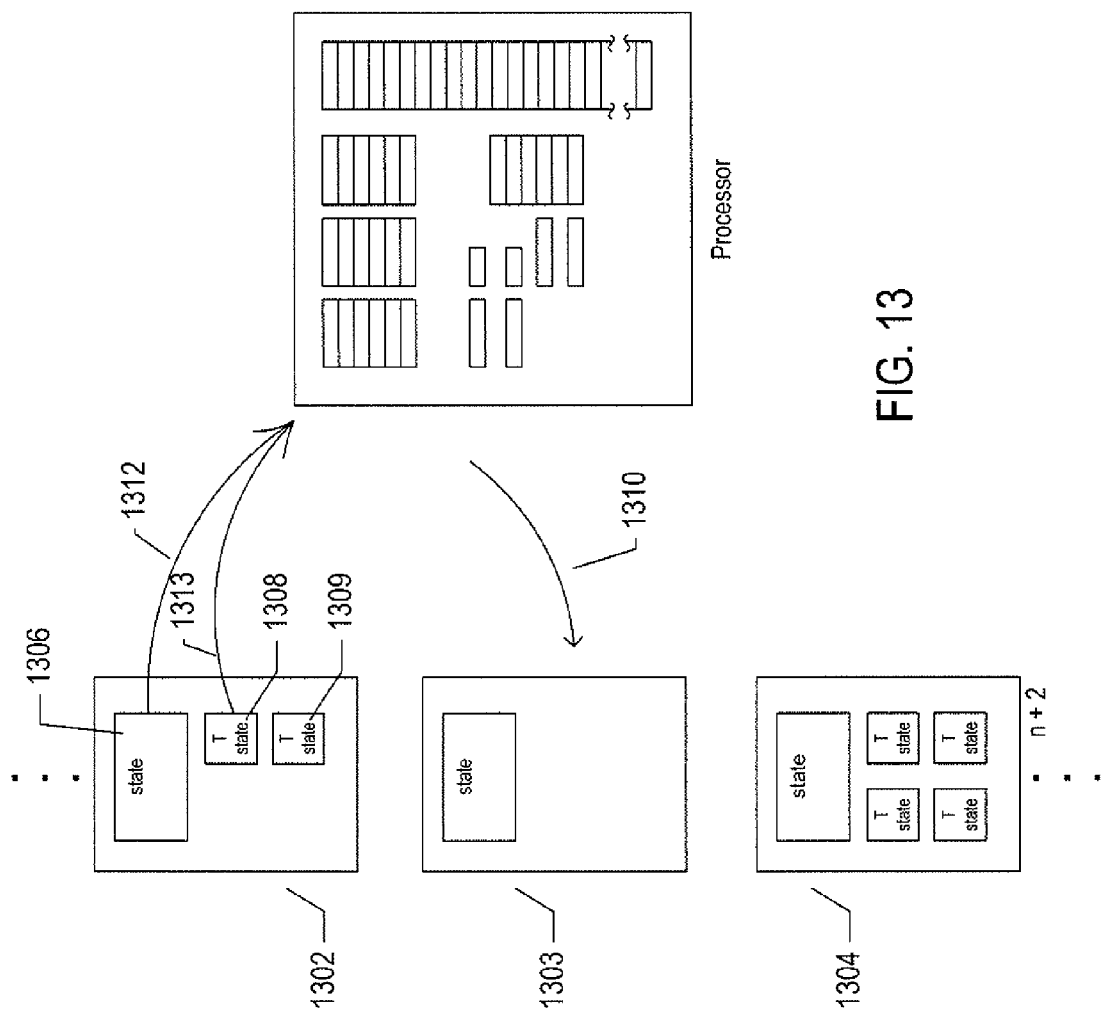
FIG. 13 illustrates a general technique for temporal multiplexing used by many operating systems.

In many modern operating systems, the operating system provides an execution environment for concurrent execution of a large number of processes, each corresponding to an executing application program, on one or a relatively small number of hardware processors by temporal multiplexing of process execution. FIG. 13 illustrates a general technique for temporal multiplexing used by many operating systems. The operating system maintains a linked list of process-context data structures, such as data structure 1302-1304, in memory. Each process-context data structure stores state information for the process, such as state information 1306 in data structure 1302, along with additional state for concurrently executing threads, such as thread states 1308-1309 in data structure 1302. The operating system generally provides blocks of time or blocks of execution cycles to the concurrently executing processes according to a process-execution-scheduling strategy, such as round-robin scheduling or various types of more complex scheduling strategies, many employing pre-emption of currently executing processes. Dormant processes are made executable by a context switch, as indicated in FIG. 13, during which a portion of the architectural state of a currently executing process is stored into an associated process-context data structure for the process, as represented by arrow 1310 in FIG. 13, and the stored portion of the architectural state of a dormant process is loaded into processor registers, as indicated by arrows 1312-1313 in FIG. 13. In general, a process is allowed to execute for some predetermined length of time or until the process is stalled or blocked, waiting for the availability of data or the occurrence of an event. When either the allotted amount of time or number of processor cycles have been used or when the process is stalled, a portion of the architectural state of the process and any concurrent threads executing within the context of the process are stored in the associated process-context data structure, freeing up the hardware resources mapped to the process in order to allow execution of a different process. In the operating-system context, threads are essentially light-weight processes with minimal thread-specific state. In many cases, each thread may have a thread-specific set of registers, but all the threads within a particular process context generally share the virtual-memory address space for the process. Thus, in general, the threads represent different execution instantiations of a particular application corresponding to the process within which the threads execute. One example of a multi-threaded application is a server application in which a new execution thread is launched to handle each incoming request. In general, an operating system may provide for simultaneous execution of as many threads as there are logical processors in the computing system controlled by the operating system. Until recently, the smallest granularity hardware resource for execution of an execution thread was an actual hardware processor. As discussed further below, in certain more recent and currently available processors, the smallest-granularity hardware resource supporting execution of a process or thread is a logical processor that corresponds to a hardware thread within an SMT processor or SMT-processor core.

Figure 14:
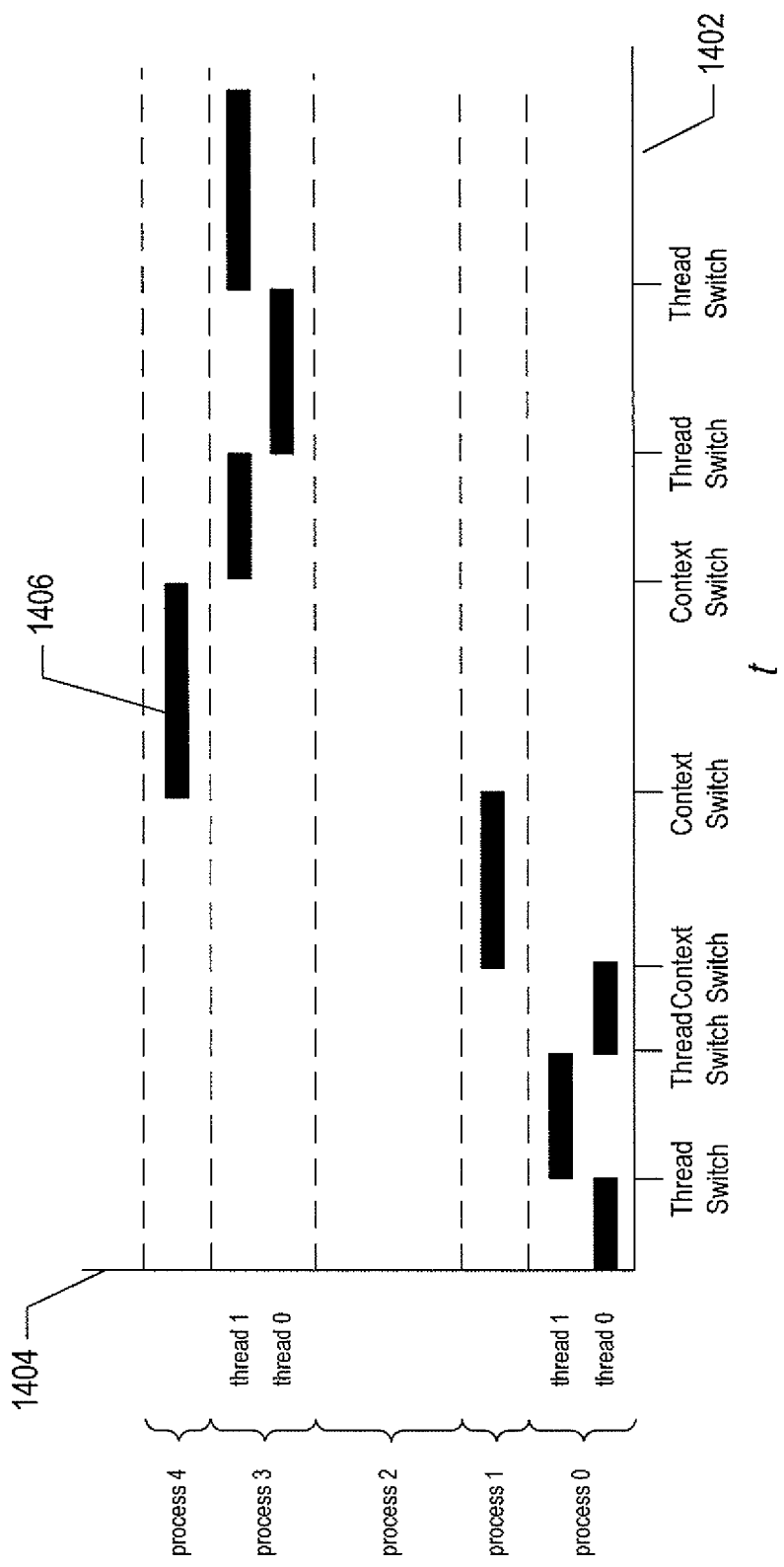
FIG. 14 illustrates temporal multiplexing of process and thread execution by an operating system with respect to a single processor or logical processor.

FIG. 14 illustrates temporal multiplexing of process and thread execution by an operating system with respect to a single processor or logical processor. In FIG. 14, the horizontal axis 1402 represents time and the vertical axis 1404 represents the various processes and threads concurrently executing on the processor or logical processor. The shaded, horizontal bars, such as shaded horizontal bar 1406, represent the period of time during which a particular process or thread executes on the processor or logical processor. As indicated along the horizontal axis, the end of one shaded horizontal bar aligns with the beginning of a different shaded horizontal bar and coincides with either a thread switch or context switch that allows execution to be transferred from one thread or process to another thread or process. The time required for the operating system to carry out a thread switch or context switch is not shown in FIG. 14, and is generally relatively insignificant in comparison to the amount of time devoted to execution of application instructions and system routines unrelated to context switching.

SMT processors, a relatively recent development in hardware architecture, provide for simultaneous execution of multiple hardware execution threads. SMT processors or SMT-processor cores provide for simultaneous hardware-execution threads by duplicating a certain portion of the hardware resources, including certain of the ISA registers, within a processor or processor core, by partitioning other of the hardware resources between hardware-execution threads, and by allowing hardware-execution threads to compete for, and share, other of the hardware resources. Modern processors are highly pipelined, and SMT processors or SMT-processor cores can often achieve much higher overall computational throughput because the various processor resources that would otherwise be idled during execution of the instructions corresponding to one hardware thread can be used by other, simultaneously executing hardware threads. Operating system threads, discussed earlier with reference to FIGS. 13 and 14, and hardware threads are conceptually similar, but differ dramatically in implementation and operational characteristics. As discussed above with reference to FIG. 14, operating-system-provided threads are products of temporal multiplexing by the operating system of hardware resources, and the temporal multiplexing involves operating-system-executed context switches. By contrast, hardware threads actually simultaneously execute within a processor or processor core, without hardware-thread context switches. Complex pipelined architecture of modern processors allows many different instructions to be executed in parallel, and an SMT processor or SMT-processor core allows instructions corresponding to two or more different hardware threads to be simultaneously executed.

Figure 15:
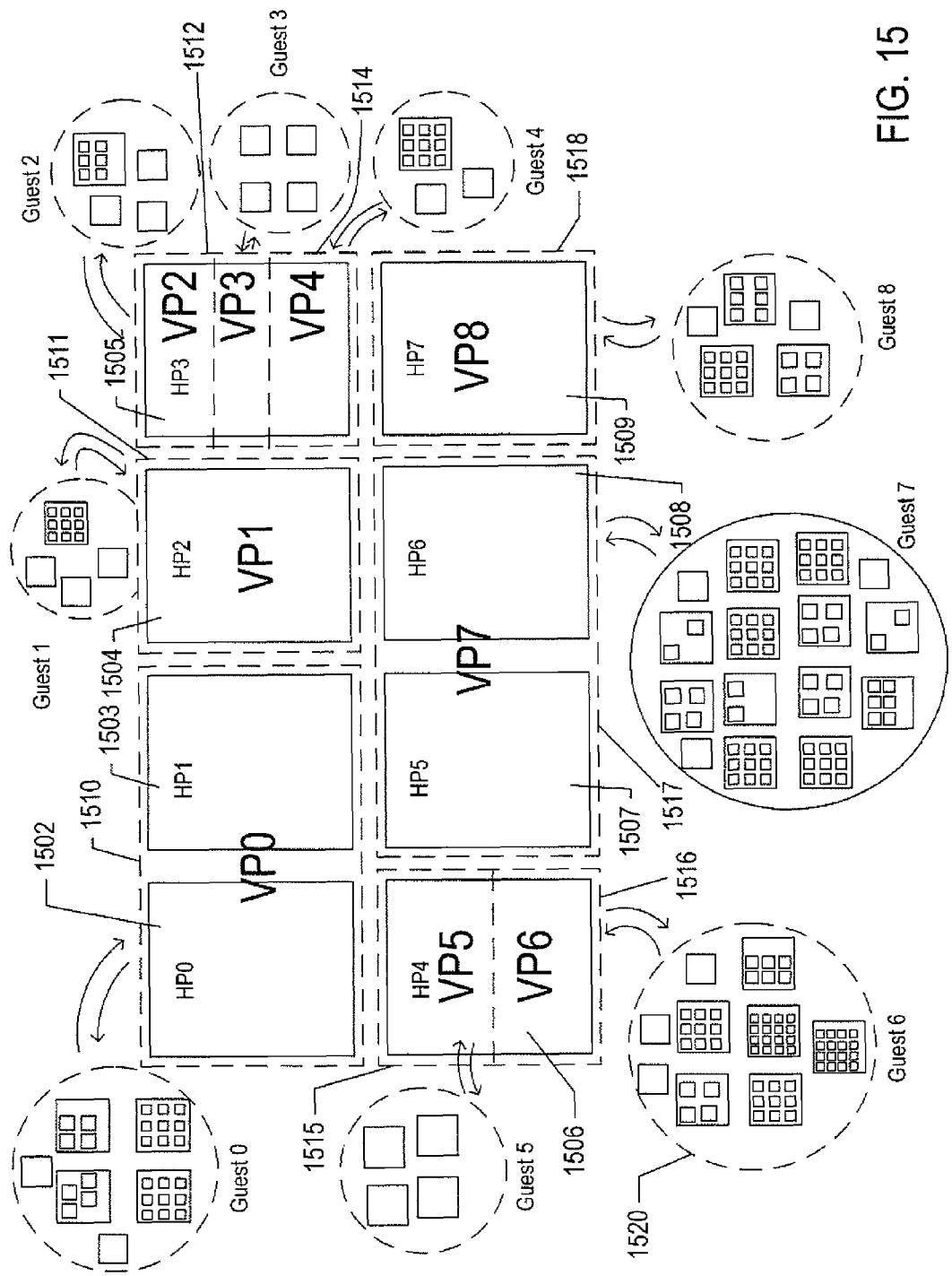
FIG. 15 illustrates an example of a complex execution environment provided by a multi-processor-based computer system in which many different processes and threads are concurrently and simultaneously executed.

FIG. 15 illustrates an example of a complex execution environment provided by a multi-processor-based computer system in which many different processes and threads are concurrently and simultaneously executed. The computer system illustrated in FIG. 15 includes eight SMT processors or processor cores HP0, HP1, . . . , HP7 1502-1509, each illustrated as rectangles with solid-line boundaries. A VMM may create a virtual-processor abstraction, mapping VMM virtual processors to hardware processing resources. In the example shown in FIG. 15, a VMM maps, as one example, virtual processor VP0 1510 to the pair of hardware processors 1502 and 1503, with the virtual processor indicated by a rectangle with dashed-line boundaries enclosing the two hardware processors. Similarly, the VMM maps virtual processor VP1 1511 to hardware processor 1504, virtual processors VP2, VP3, and VP4 1512-1514 to hardware processor 1505, virtual processors VP5 1515 and VP6 1516 to hardware processor 1506, virtual processor VP7 1517 to hardware processors 1507 and 1508, and virtual processor VP8 1518 to hardware processor 1509. In the case of SMT processors, the VMM may map, as one example, a virtual processor to each hardware thread provided by an SMT processor. For example, in the example shown in FIG. 15, virtual processors VP5 and VP6, 1515 and 1516 respectively, may each be mapped to a single hardware thread provided by SMT processor or SMT-processor core 1506. The VMM may execute a VM, including a guest operating system and one or more application programs, on each virtual processor. The guest operating system within each VM may provide an execution environment for the concurrent and/or simultaneous execution of many different processes and/or execution threads. In FIG. 15, the processes and threads executing within process contexts within the execution environment provided by a guest operating system are shown inside dashed circles, such as dashed circle 1520. Thus, a modern computer system may provide multiple, hierarchically ordered execution environments that, in turn, provide for simultaneous and/or concurrent execution of many different processes and execution threads executing within process contexts.

With the introduction of SMT processors and SMT-processor cores, the level of complexity has additionally increased. Monitoring computational throughput provided to each virtual machine in these complex environments is non-trivial, and the performance-monitoring registers and other hardware facilities provided by modern processors are generally inadequate for determining the computational throughputs for VMs mapped to hardware threads. Determination of computational throughputs for VMs managed by VMM is useful in scheduling VM execution and optimizing execution schedules as well as in accounting operations used to charge clients of large computer systems, such as cloud-computing facilities, based on the processor cycles used by the clients or on some type of measured computational throughput, often related to the rate of instruction execution provided to the clients. As further discussed below, in the case that clients are billed based on clock time during which their applications run within a cloud-computing facility, and when their applications experience performance imbalances that result in frequent stalling on exhausted resources with respect to one or VMs of another client simultaneously executing on hardware threads within an SMT processor or SMT-processor core shared by multiple clients, accounting only by clock time or even by instruction throughput may result in less-than-fair billing practices. A more fair accounting procedure would be to bill clients based on productive execution of instructions. However, as discussed further below, current hardware performance-monitoring facilities are inadequate to detect many types of performance imbalance.

Figure 16:
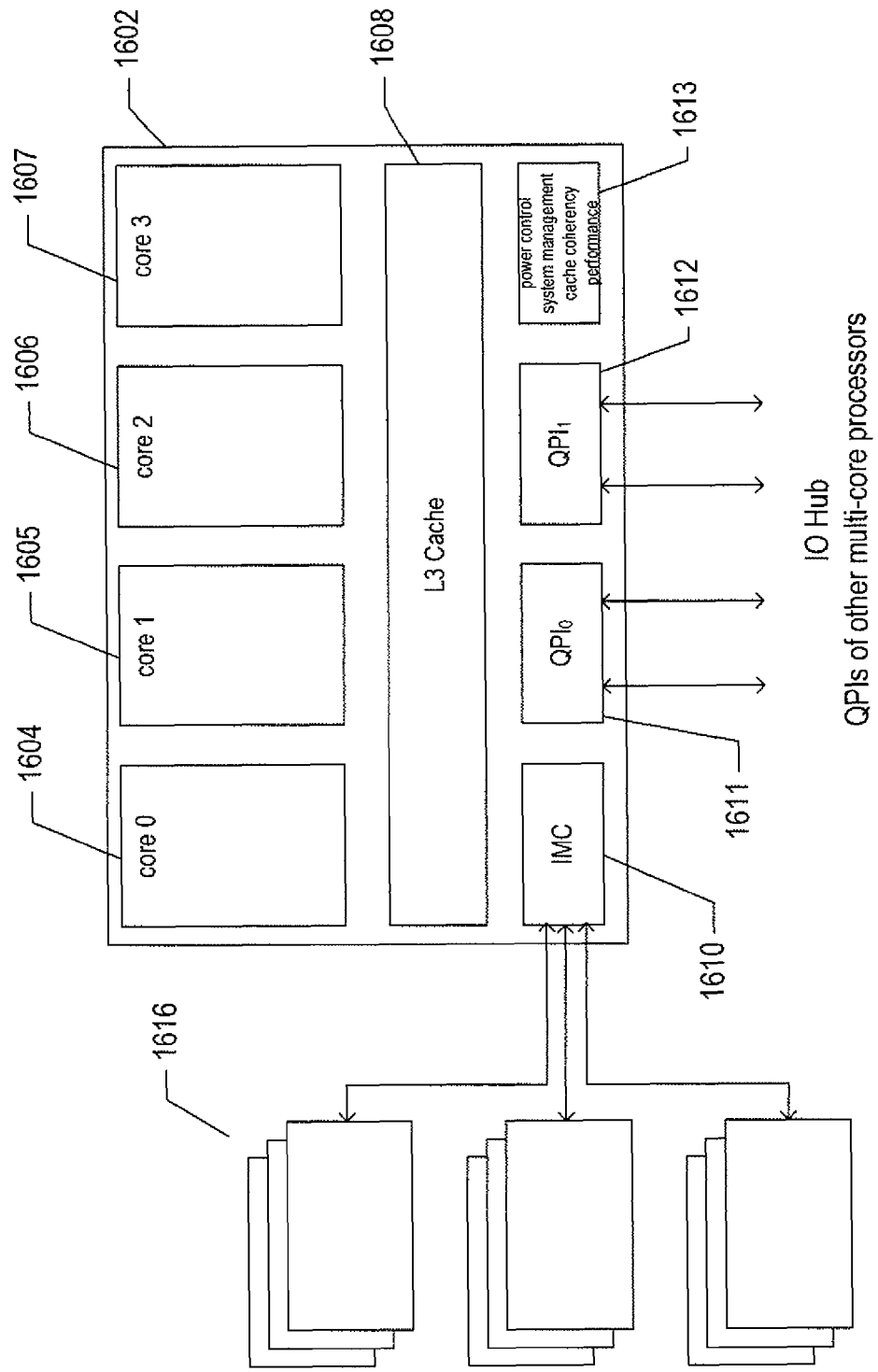
FIG. 16 illustrates an example multi-core processor.

FIG. 16 illustrates an example multi-core processor. The multi-core processor 1602 includes four processor cores 1604-1607, a level-3 cache 1608 shared by the four cores 1604-1607, and additional interconnect and management components 1610-1613 also shared among the four processor cores 1604-1607. Integrated memory controller ("IMC") 1610 manages data transfer between multiple banks of dynamic random access memory ("DRAM") 1616 and the level-3 cache ("L3 cache") 1608. Two interconnect ports 1611 and 1612 provide data transfer between the multi-core processor 1602 and an IO hub and other multi-core processors. A final, shared component 1613 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 1608 and the multi-core processor shown in FIG. 16 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is copied from the L2 cache into the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache.

Figure 17:
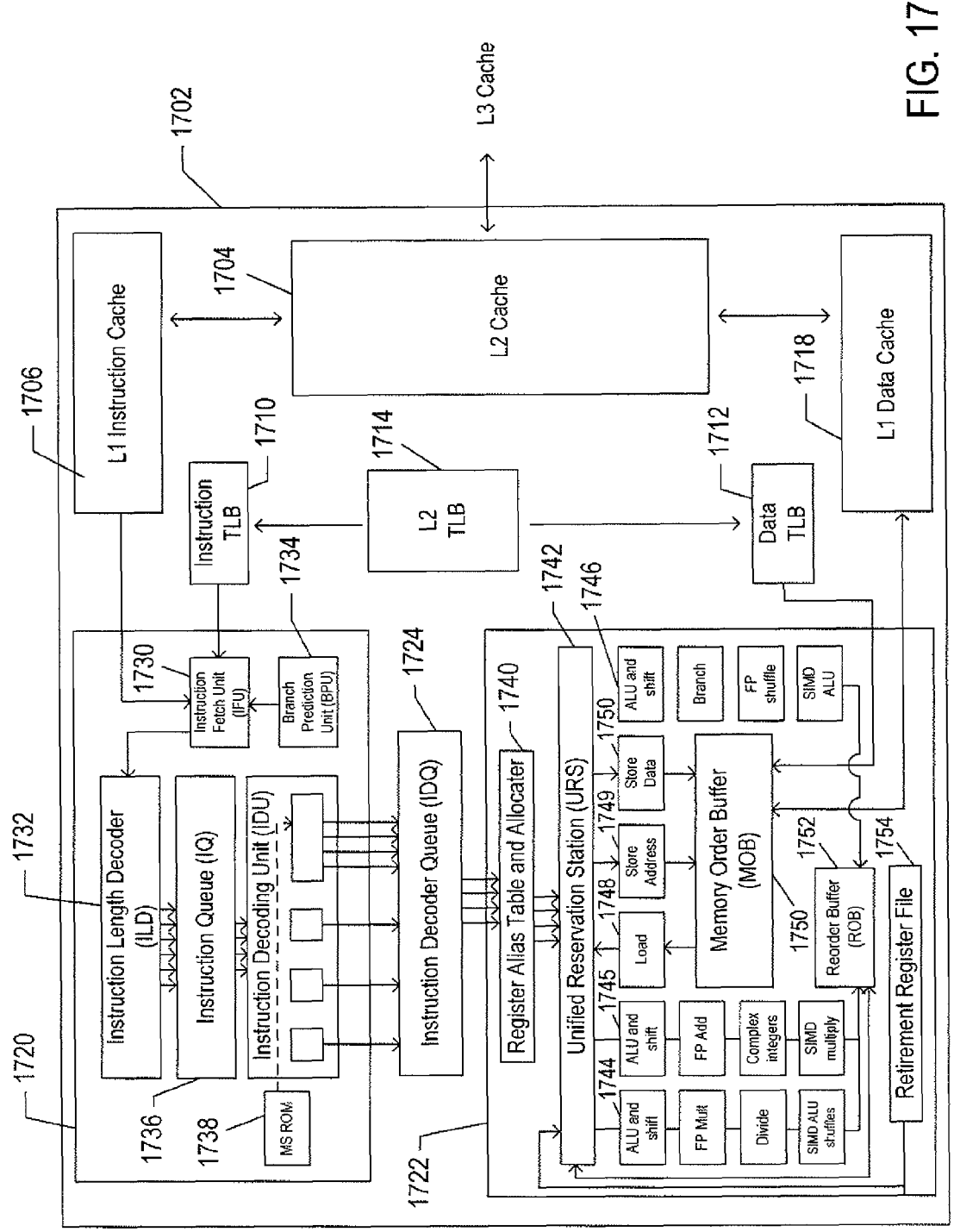
FIG. 17 illustrates the components of an example processor core.

FIG. 17 illustrates the components of an example processor core. As with the descriptions of the ISA and system registers, with reference to FIGS. 11 and 12, and with the description of the multi-core processor, with reference to FIG. 16, the processor core illustrated in FIG. 17 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 1702 illustrated in FIG. 17 includes an L2 cache 1704 connected to an L3 cache (1608 in FIG. 16) shared by other processor cores as well as to an L1 instruction cache 1706 and an L1 data cache 1708. The processor core also includes a first-level instruction translation-lookaside buffer ("TLB") 1710, a first-level data TLB 1712, and a second-level, universal TLB 1714. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 1702 includes a front-end in-order functional block 1720 and a back-end out-of-order-execution engine 1722. The front-end block 1720 reads instructions from the memory hierarchy and decodes the instructions into simpler microinstructions which are stored in the instruction decoder queue ("IDQ") 1724. The microinstructions are read from the IDQ by the execution engine 1722 and executed in various parallel execution pipelines within the execution engine. The front-end functional block 1720 include an instruction fetch unit ("IFU") 1730 that fetches 16 bytes of aligned instruction bytes, on each clock cycle, from the L1 instruction cache 1706 and delivers the 16 bytes of aligned instruction bytes to the instruction length decoder ("ILD") 1732. The IFU may fetch instructions corresponding to a particular branch of code following a branch instruction before the branch instruction is actually executed and, therefore, before it is known with certainty that the particular branch of code will be selected for execution by the branch instruction. Selection of code branches from which to select instructions prior to execution of a controlling branch instruction is made by a branch prediction unit 1734. The ILD 1732 processes the 16 bytes of aligned instruction bytes provided by the instruction fetch unit 1730 on each clock cycle in order to determine lengths of the instructions included in the 16 bytes of instructions and may undertake partial decoding of the individual instructions, providing up to six partially processed instructions per clock cycle to the instruction queue ("IQ") 1736. The instruction decoding unit ("IDU") reads instructions from the IQ and decodes the instructions into microinstructions which the IDU writes to the IDQ 1724. For certain complex instructions, the IDU fetches multiple corresponding microinstructions from the MS ROM 1738.

The back-end out-of-order-execution engine 1722 includes a register alias table and allocator 1740 that allocates execution-engine resources to microinstructions and uses register renaming to allow instructions that use a common register to be executed in parallel. The register alias table and allocator component 1740 then places the microinstructions, following register renaming and resource allocation, into the unified reservation station ("URS") 1742 for dispatching to the initial execution functional units 1744-1746 and 1748-1750 of six parallel execution pipelines. Microinstructions remain in the URS until all source operands have been obtained for the microinstructions. The parallel execution pipelines include three pipelines for execution of logic and arithmetic instructions, with initial functional units 1744-1746, a pipeline for loading operands from memory, with initial functional unit 1748, and two pipeline, initial functional units 1749-1750, for storing addresses and data to memory. A memory-order buffer ("MOB") 1750 facilitates speculative and out-of-order loads and stores and ensures that writes to memory take place in an order corresponding to the original instruction order of a program. A reorder buffer ("ROB") 1752 tracks all microinstructions that are currently being executed in the chains of functional units and, when the microinstructions corresponding to a program instruction have been successfully executed, notifies the retirement register file 1754 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 18:
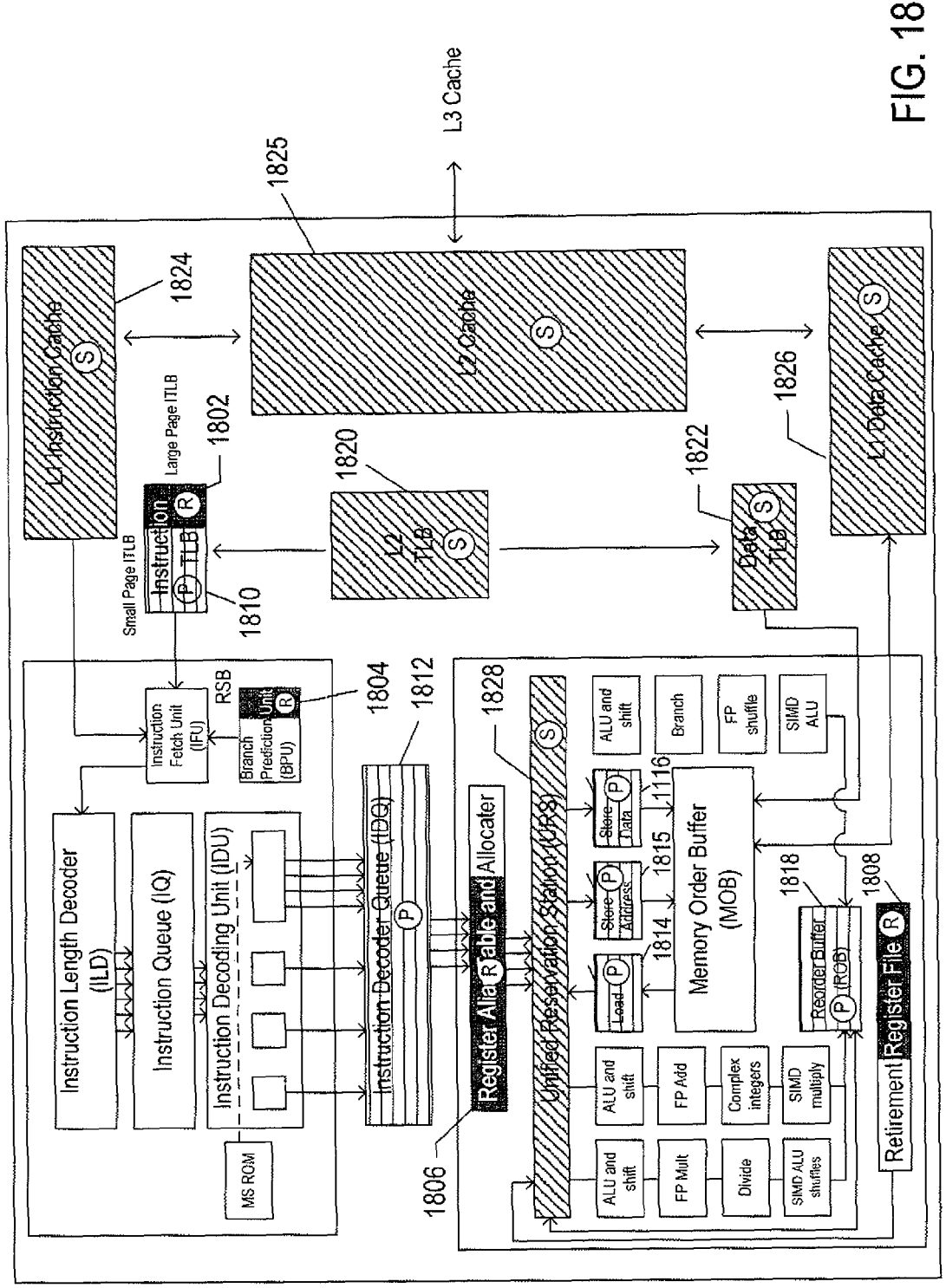
FIG. 18 illustrates, using the illustration conventions employed in FIG. 17, certain of the modifications to the processor core illustrated in FIG. 17 that enable two hardware threads to concurrently execute within the processor core.

FIG. 18 illustrates, using the illustration conventions employed in FIG. 17, certain of the modifications to the processor core illustrated in FIG. 17 that enable two hardware threads to concurrently execute within the processor core. There are four basic approaches employed to prepare hardware components for multi-threading. In a first approach, the hardware components are used identically in an SMT-processor core as they are used in a processor core that does not support simultaneous execution of multiple threads. In FIG. 18, those components that are not altered to support similar threads are shown identically as in FIG. 17. In a second approach, certain of the functional components of the microprocessor may be replicated, each hardware thread exclusively using one replicate. Replicated components are shown in FIG. 18 with shading as well as a circled "R." A portion of the first-level instruction TLB 1802 is replicated, as is the return-stack-buffer portion of the BPU 1804. The register alias table is replicated 1806 and, of course, the architecture state embodied in the register file is replicated 1808, with each hardware thread associated with its own architecture state. Yet another strategy is to partition the particular functional components, allowing a particular hardware thread to access and employ only a portion of the functional component. In FIG. 18, those functional components that are partitioned among hardware threads are indicated by a circled "P" and horizontal cross-hatching. Partitioned components include a portion of the first-level instruction TLB 1810, the IDQ 1812, load and store buffers 1814-1816, and the reorder buffer 1818. The partitioning may be a hard, fixed partitioning in which each of n hardware threads can access up to 1/n of the total functionality provided by the component, or may be a more flexible partitioning in which each hardware thread is guaranteed access to some minimal portion of the resources provided by the functional component, but the portion actually employed at any given point in time may vary depending on the execution states of the hardware threads. Finally, functional components may be shared, with the hardware threads competing for the resources provided by the functional component. Shared components are indicated in FIG. 18 by diagonal cross-hatching and circled "S" symbols. The shared components include the second-level TLB 1820, the data TLB 1822, the L1 and L2 caches 1824-1826, and the URS 1828. In certain cases, a very minimal portion of the resource provided by a shared component may be guaranteed to each hardware thread.

Hardware-Decoupled Virtualized PMUs

Figure 19:
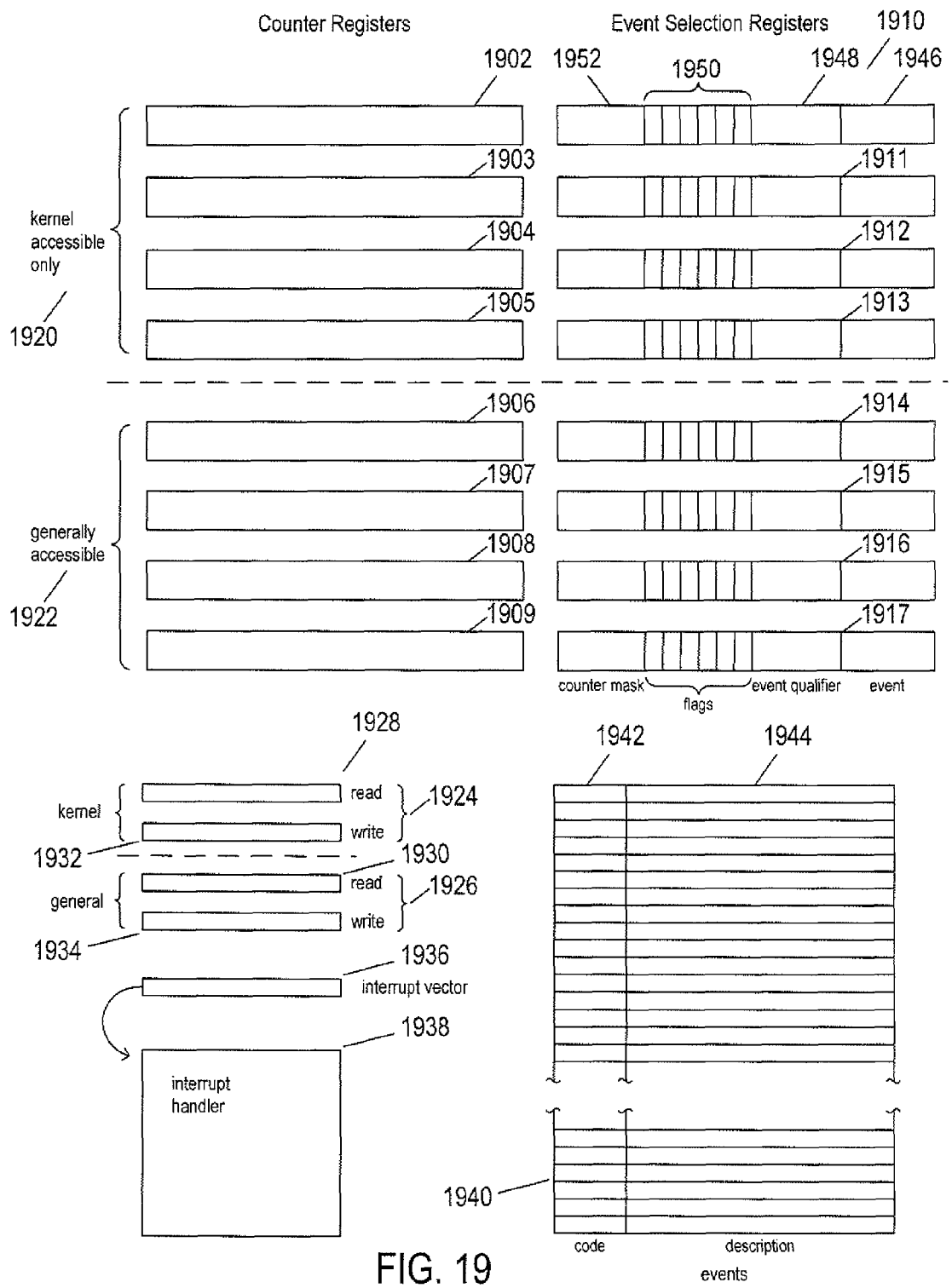
FIG. 19 illustrates a hypothetical PMU interface representative of the types of functionalities provided by a processor PMU.

FIG. 19 illustrates a hypothetical PMU interface representative of the types of functionalities provided by a processor PMU. In this hypothetical PMU interface, two sets of PMU registers are provided: (1) a set of counter registers 1902-1909; and (2) a set of event-selection registers 1910-1917. The PMU counter and event-selection registers 1902-1917 are divided into a set of kernel-accessible-only PMU registers 1920 and a set of generally accessible PMU registers 1922. In addition, the PMU interface includes a pair of privileged PMU-register-access instructions 1924 and a pair of non-privileged PMU-register-access registers 1926. The two register pairs each includes a read-PMU-register instruction 1928 and 1930 and a write-PMU-register instruction 1932 and 1934. The PMU interface also includes one or more interrupt vectors 1936 provided by an operating system or virtualization layer and an associated one or more interrupt handlers 1938 that allow PMU-associated events to interrupt, and be handled by, an operating system or virtualization layer. In addition, the PMU interface defines a set of events, shown in an events table 1940 in FIG. 19, that can be monitored by the PMU. In the hypothetical PMU interface shown in FIG. 19, each event is represented by a row, or entry, in the events table, each entry including a code field 1942 and a description field 1944. The code field includes a numeric event code and the description field includes a short textual description of the processor event that can be monitored by the PMU.

The counter registers 1902-1909 accumulate counts of particular types of events during processor operation. While generally initialized by clearing the counter registers, after which they have the value "0," counter registers may be alternatively initialized to particular numeric values. The counter registers essentially store performance-monitoring data and can be accessed by a PMU-interface read instruction. In a hypothetical PMU interface shown in FIG. 19, the privileged PMU-register-access-register pair 1924 is used to access the privileged counter registers 1902-1905 and event-selection registers 1910-1913 and the non-privileged PMU-register-access-instruction pair 1926 is used to access the non-privileged PMU registers 1906-1909 and 1914-1917.

The event-selection registers, when written by use of a write PMU-register-access instruction, instruct the processor to count particular types of events in the counter register associated with the event-selection register. The event-selection registers include a event field 1946, into which an event code is written in order for events of the type represented by the event code to be counted in the associated counter register. An auxiliary event field 1948 may be used to further quality particular types of events. For example, a code entered into the auxiliary event field may specify counting of logical subsets of events that belong to the event type associated with the code entered into the event field 1946. The event-selection registers additionally contain a set of single-bit flags 1950 that further control performance-monitoring with respect to the associated counter register. For example, an OS flag may select one of two modes for performance monitoring: (1) a first mode in which events that occur when the processor is operating at a highest privilege level are counted; and (2) a second mode in which all events are counted, regardless of the privilege level. Another flag may enable and disable interrupts. Finally, the event-selection registers may include a mask field 1952 that specifies a number of events of the type indicated by the event field 1946 that must occur during a defined period of time for the counter to be incremented. Many other types of operational behaviors may be selected by additional types of flags 1950.

As mentioned above, the PMU interface provided by any particular type of processor and processor-model subtype may differ dramatically from the PMU provided by another type of processor or processor-model subtype. Different PMU interfaces may allow for counting of different types and numbers of events, as one example. As another example, different PMU interfaces may provide a different number of PMU registers and may or may not provide separate banks of privileged and non-privileged PMU registers and privileged and non-privileged PMU-register-access instructions. The PMU interfaces of processors within a single multi-processor computer system may differ in these ways. For more complex, distributed multi-processor systems, many different PMU interfaces may be present within the system. This problem may greatly expand in the case of virtual data centers, in which case there may be thousands of different multi-processor servers that provide a wide variety of different types of PMU interfaces. As a virtual machine moves among different processors, the actual underlying hardware PMUs of the hardware processor or processors on which a virtual machine executes may change, as discussed below.

Figure 20:
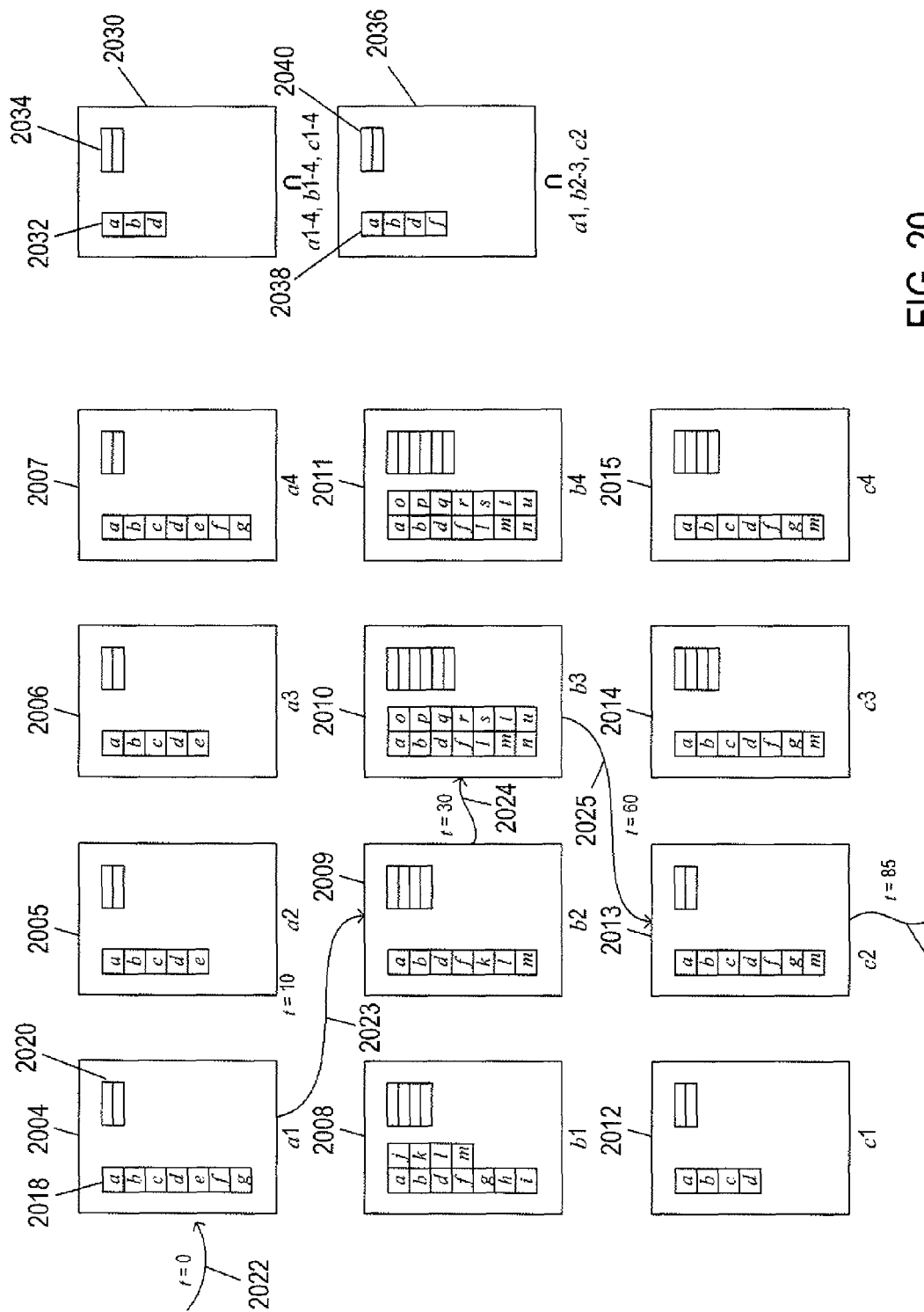
FIG. 20 illustrates performance monitoring with respect to a process or thread within a complex, virtualized computer system.

FIG. 20 illustrates performance monitoring with respect to a process or thread within a complex, virtualized computer system. The system includes 12 different processors a1-4, b1-4, and c1-4 each associated with a PMU interface. In FIG. 20, the 12 processors are represented by rectangles 2004-2015. Features of the PMU interface associated with the processor is shown within the rectangle. The events that can be monitored are represented by lower-case letters in one or two vertical columns and the number of PMU counter registers provided by the PMU interface are indicated by the number of registers in a right-hand vertical column of PMU counter registers. For example, for processor a1 2004, the PMU interface provided by the processor allows for monitoring of the events 2018 a, b, c, d, e, f, and g and provides two PMU counter registers 2020. A particular VM is launched, for which performance monitoring is desired. The migration path of the VM among processors is illustrated, in FIG. 20, by curved arrows, including curved arrows 2022-2026, each associated with a time value t that represents the time of launch of the VM, times of migration between processors, and completion time of the monitoring. The VM is launched at time t=0 on processor a1, migrates to processor b2 at time t=10, migrates at time t=30 to processor b3, migrates at time t=60 to processor c2, and monitoring finishes at time t=85.

Figure 21:
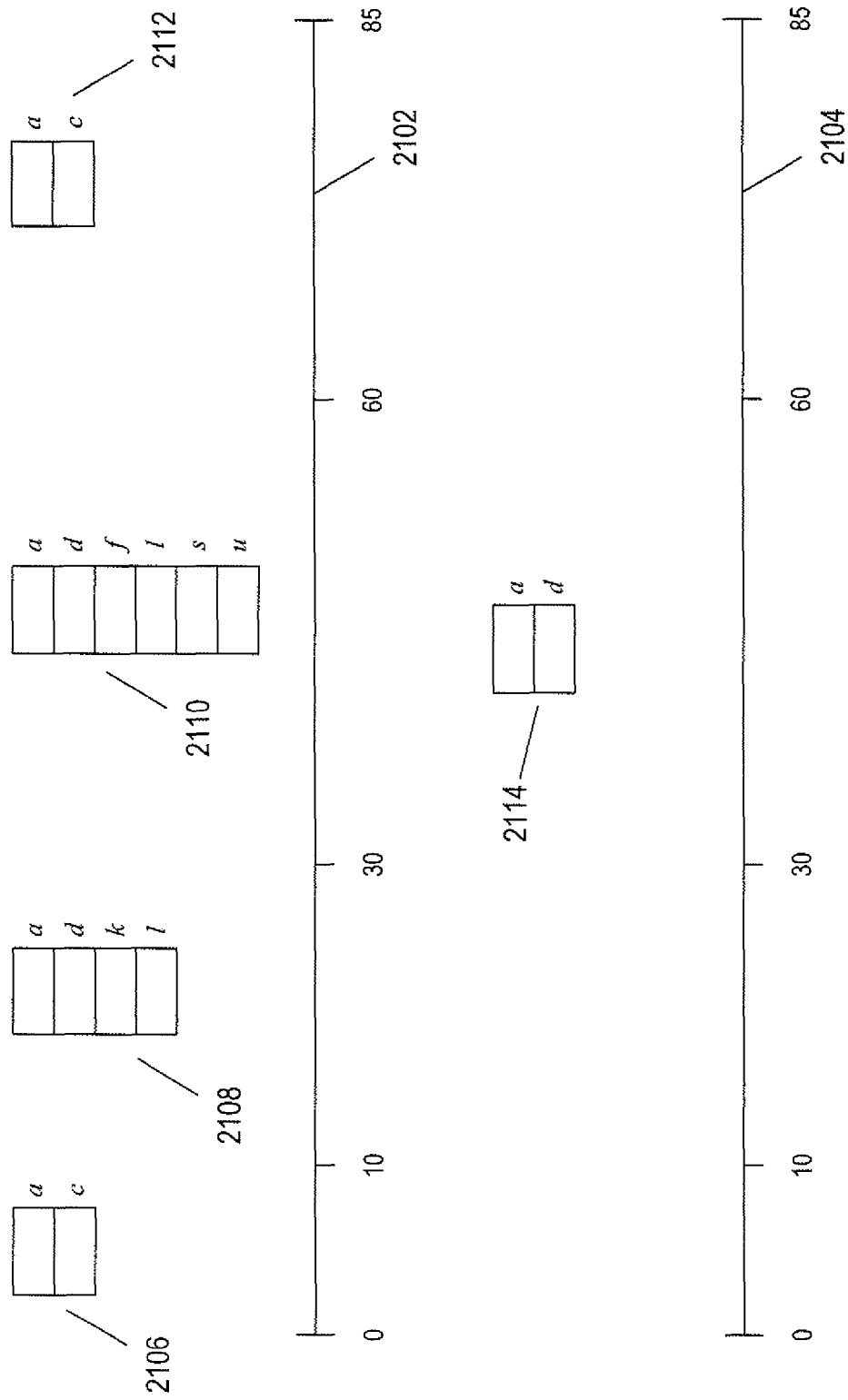
FIG. 21 illustrates, using timelines, several different performance-monitoring strategies for the process shown in FIG. 20.

FIG. 21 illustrates, using timelines, several different performance-monitoring strategies for the VM shown in FIG. 20. The timeline is represented by a horizontal axis 2102 and 2104 with the times t=0, 10, 30, 60, and 85, shown in FIG. 20, shown along the time axes in FIG. 21. In a first strategy, shown with reference to the first timeline 2102, a maximum number of events that can be monitored by the available PMU counter registers are monitored as the VM executes on each processor. On processor a1, the events a and c are monitored by the two PMU counter registers 2106. On processor b2, from t=10 to t=30, the four events a, d, k, and l are monitored using the four PMU counter registers 2108. Between times t=30 and t=60, the six processor events a, d, f, l, s, and u are measured by the six available PMU counter registers 2110. Finally, on processor c2, the two processor events a and c are monitored using the two available PMU counter registers 2112.

This strategy is fraught with potential problems. First, only processor event a is monitored over the entire execution of the VM. In many cases, the execution of a process within a VM involves different stages that occupy different portions of the timeline of process execution. When a particular type of processor event is monitored only for a portion of this timeline, it is possible that the frequency of occurrence of the event may be erroneously inferred, for the entire process execution, based on an atypical frequency of occurrence that occurred only during the monitored portion of process execution. Often, it is not the absolute frequency of occurrence of processor events that is of interest, but, instead, it is the relative frequency of occurrence of different events from which various types of conclusions can be made. In the example shown with respect to a timeline 2102 in FIG. 21, processor event c is monitored only between times t=0 and t=10 and between times t=60 and t=85, while processor event d is monitored only between times t=10 and t=60. Thus, there is no time interval during VM execution within which the frequency of occurrence of event c is concurrently monitored with the frequency of occurrence of event d. Therefore, any conclusions based on the accumulated counts for event c relative to the frequency of occurrence of events of type d may be erroneous, since no actual concurrent monitoring of the two types of events was carried out. Yet another problem in this example is that certain of the events, including events f, k, s, and u, are monitored only during the execution of the VM on a single processor. As a result, it would not be possible to draw general conclusions about the frequency of occurrence of these types of events over the life of the VM. A final, and potentially severe problem, is that high-level performance-monitoring tools would need to be aware of the different PMU interfaces provided by the various different processors on which the VM executes and control selection of which events, of the possible events that can be monitored, should be monitored on each processor. However, it is often the case that the identities of the physical processors on which a VM executes, in a virtualized system, may not be available to either guest operating systems or higher-level application programs. Furthermore, even when available, the overheads involved in passing the information out from the virtualized layer and receiving performance-monitoring instructions from a high-level performance-monitoring tool for forwarding to a processor may introduce severe delays and perturbations in low-level performance monitoring that would render collected data inaccurate and even meaningless. These problems are compounded when a VM concurrently executes on multiple processors.

Another approach to performance monitoring for execution of the VM illustrated in FIG. 20 is to determine some type of universal event set and PMU-counter-register number available on all processors of the system and to select events for monitoring from this universal set of events and PMU counter registers. In FIG. 20, the maximum set of events and maximum number of PMU counter registers available on all processors within the system is shown in rectangle 2030. Note that the set of universal events includes only the three events a, b, and d 2032 and only two PMU counter registers 2034 are available in the intersection of the PMU-interface resources for all of the processors. Even were a universal PMU interface over the specific processors on which the VM executes considered, shown in rectangle 2036, only four different processor events a, b, d, and f 2038 are available and only two PMU counter registers 2040 are available in the universal PMU interface. The universal-PMU-interface strategy is illustrated, in FIG. 21, with respect to timeline 2104. In this case, two events a and d are selected from among the three universal events a, b, and d for monitoring on the two PMU counter registers available in the universal set 2114. By using this universal PMU interface, consistent monitoring over the entire execution of the VM can be obtained, but only for two events selected from among only three different possible universal events. This approach severely constrains the types of events that can be monitored and the total number of events that can be monitored over the lifetime of a process. A given PMU interface may provide the ability to monitor any of hundreds of different types of processor events, but these different types of events may be relatively processor specific and PMU-interface specific. As a result, when an intersection of the sets of events that can be monitored on all of the different processor/PMU-interfaces on which a process may be executed within a complex computational system, the number of universal events may be on the order of tens or fewer. Clearly, this second approach severely limits access of the capabilities of PMUs within a system.

Figure 22A:
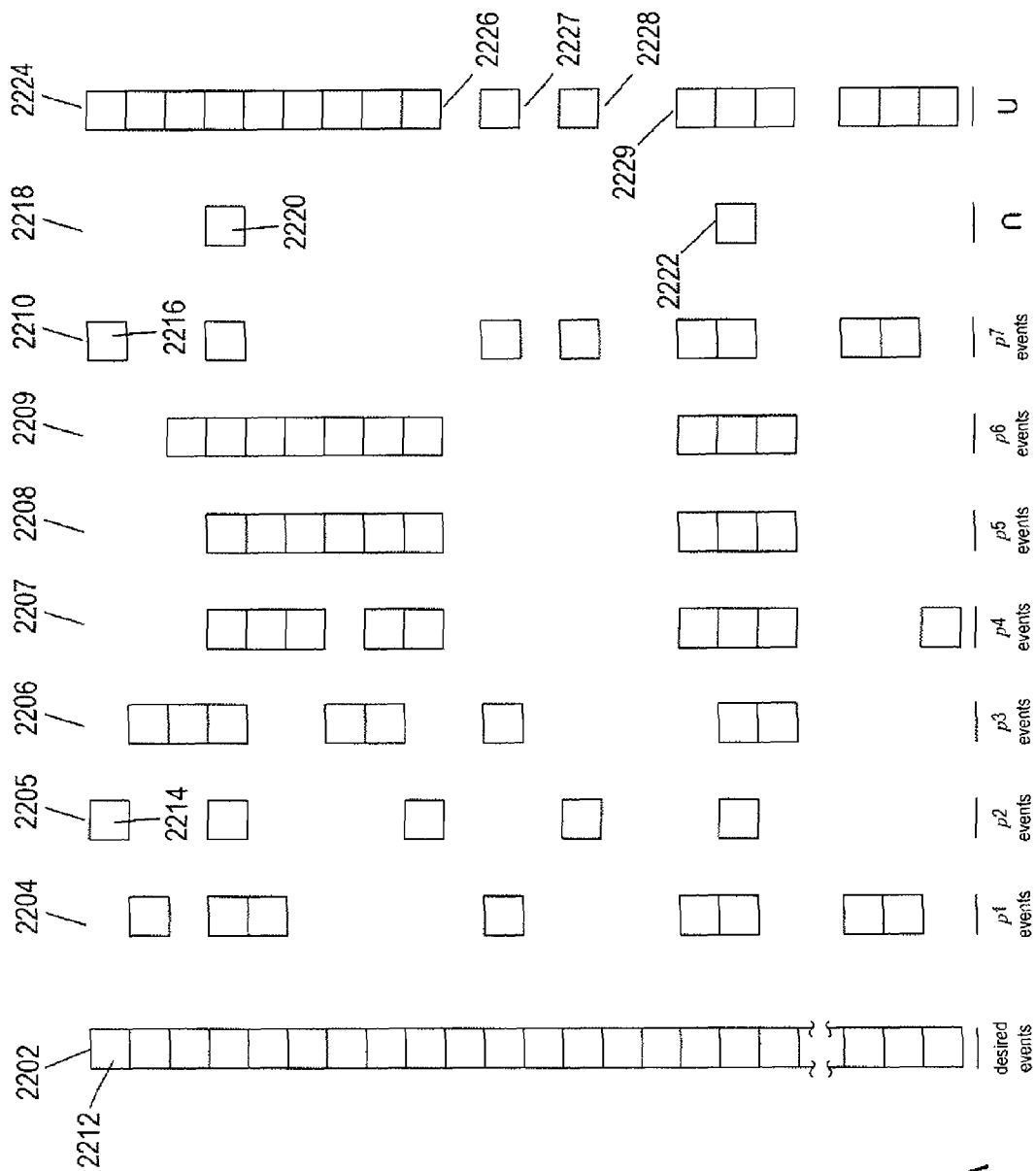

FIGS. 22A-D illustrate a computed-register method that represents one method used to implement hardware-decoupled virtualized PMUs. FIGS. 22A-D all use the same illustration conventions, next explained with reference to FIG. 22A. FIG. 22A shows columns of events, each event represented by a square, that can be, or that are desired to be, monitored by a PMU. A first column 2202 contains all of the processor events that may be desired to be monitored by designers and implementers of high-level performance-monitoring tools. Many different types of events may be included in this set of desired processor events, including memory loads and stores of various different types, register accesses, number of cache-line evictions, number of allocated cache lines, number of cache misses from various different caches accessed by the processor, number of instruction fetches and instruction-fetch misses, number of executed instruction cycles, stalled instruction cycles, number of bus requests for various different busses and other bus-related events, number of various different types of instructions executed, and many other processor events. Columns 2204-2210 show the processor events, support for monitoring of which are provided by each of seven different types of processors p1-p7. For example, the event represented by square 2212 can be monitored on processors of type p2 and p7, as indicated by squares 2214 and 2216. The absence of squares horizontally aligned with square 2212 in the columns for processors p1 and p3-p6 indicate that processors p1 and p3-p6 do not support monitoring of this event. Column 2218 represents the intersection of monitored events over all of the processor types p1-p7. Only the fourth event type 2220 and the $17^{th}$ event type 2222 are monitored in the PMU interfaces provided by all seven processor types p1-p7. Column 2224 represents the union of the events monitored by the PMU interfaces provided by the seven different processor types p1-p7. As can be seen in column 2224, only four different desired processor events 2226-2229 cannot be monitored by at least one of the processor types. Returning to the examples of FIG. 21, it is clear that the second strategy described with reference to timeline 2104 would severely constrain the ability of a performance-monitoring tool to access the functionality provided by underlying hardware PMUs of processors within a complex computational system.

Figure 22B:
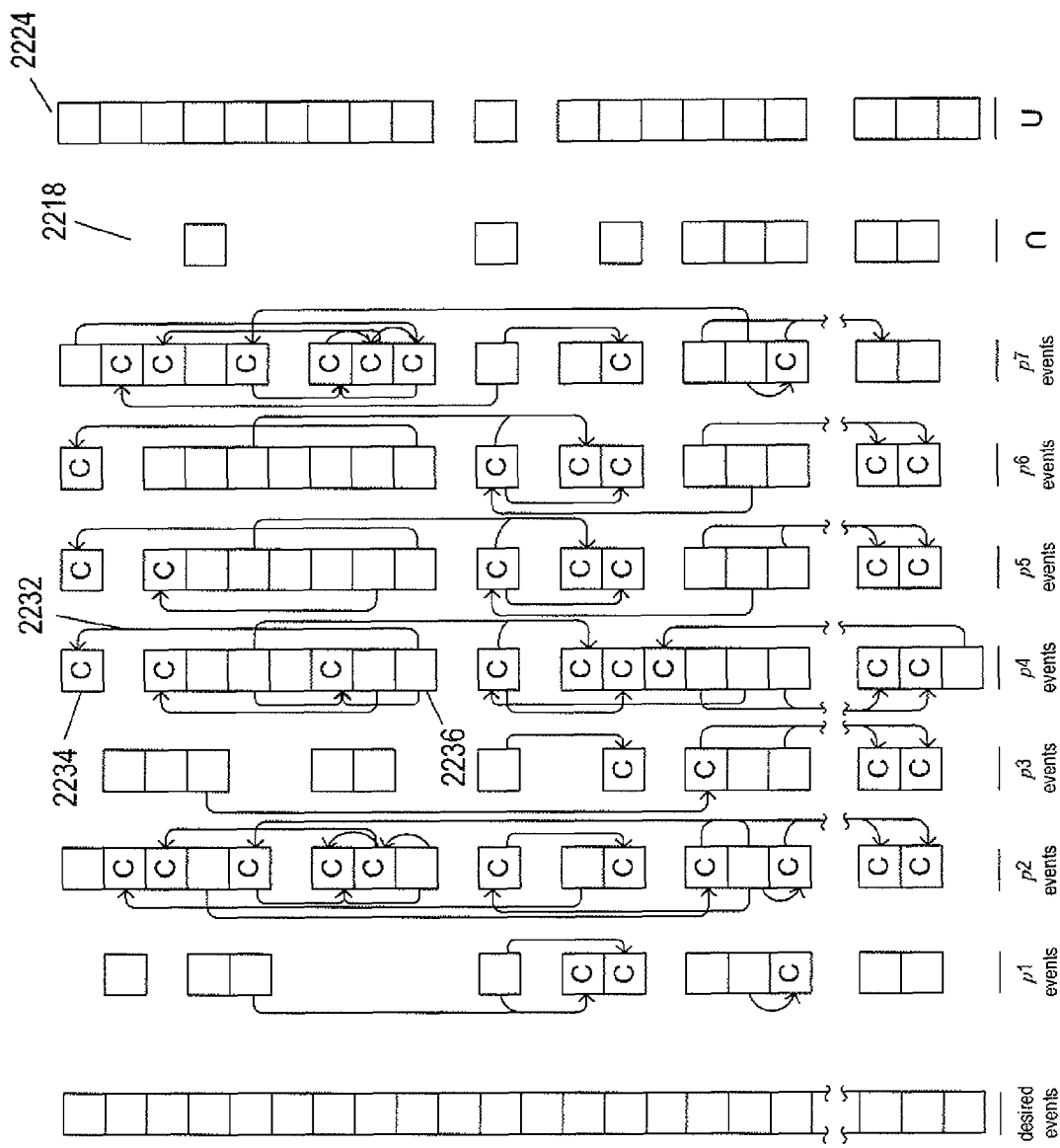

As shown in FIG. 22B, it is often possible to compute the number of certain types of processor events from the data for other types of processor events. For example, in a processor that does not provide for monitoring of the instructions executed per cycle, but does provide for monitoring of the total number of instructions executed and the total number of cycles, a computed instruction-per-cycle event can be obtained by dividing the contents of a PMU counter counting the total number of instructions executed by the contents of a PMU counter register counting the total number of cycles during some time interval. In FIG. 22B, arrows, such as arrow 2232, are used to indicate the various hardware-supported events from which a non-hardware-supported event can be computed. For example, the event represented by rectangle 2234 can be computed from the contents of a PMU counter counting the occurrences of event 2236. As shown in FIG. 22B, a relatively large number of artificial, computed events can be obtained from the hardware-provided events for each of the processors. In FIG. 22B, these computed events are indicated by the letter "C" within rectangles representing events. By supplementing the hardware-provided events with computed events, the number of events in the universal intersection of the seven types of processors, represented in column 2218, is greatly increased and the number of desired events not supported by any type of processor, represented by empty spaces in column 2224, has been decreased by half.

Figure 22C:
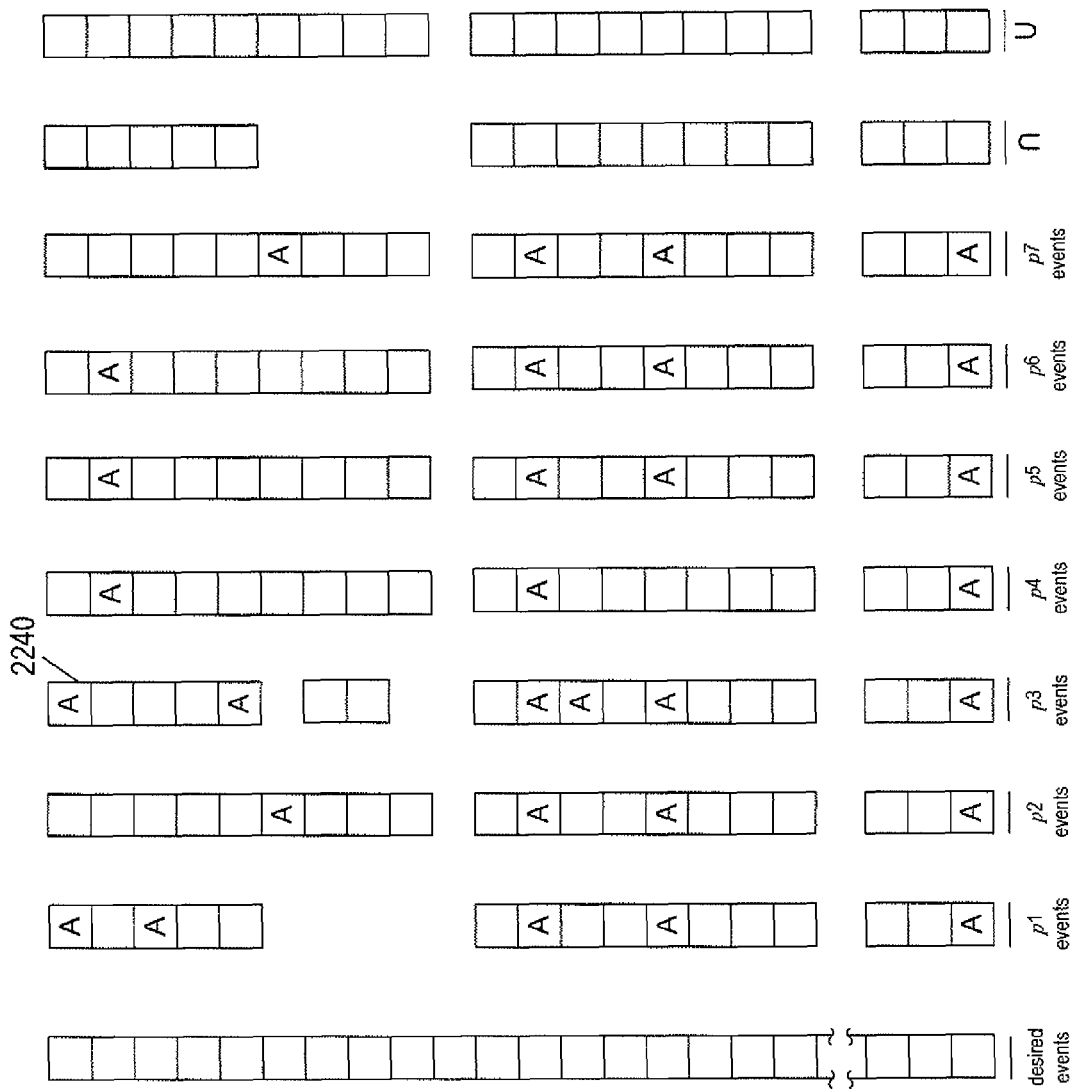

FIG. 22C illustrates an additional type of computed event, referred to as "approximated events." While the computed events, discussed above with reference to FIG. 22B, are more or less exactly calculable from hardware-supported events, an even larger number of desired events can be obtained by less-than-exact calculation, or approximation, of the desired events. In FIG. 22C, these additional approximated events are represented by event squares labeled with the letter "A," such as the event represented by square 2240. In many cases, approximated events are more than adequate for performance-monitoring purposes. In certain cases, additional PMU registers may be provided to obtain an indication of the degree of approximation for approximated events, or some type of confidence interval or range associated with the count of approximated events. Comparing the final two columns of FIG. 22C with the final two columns of FIG. 22B, it is seen that approximated events, in addition to exactly computed events, even further increases the number of processor events that can be obtained across all of the different processor types. Finally, as shown in FIG. 22D, when only a subset of the processor types are considered, the number of processor events in the intersection over the subset of processors may be increased even further, so that the universal set of events that can be monitored over the subset of processor types approaches the union of processor events over the same subset.

There are cases in which high-level performance-monitoring tools have, to some degree, attempted to provide computed events in addition to hardware-supported events for monitoring. However, the attempt to provide computed-event monitoring at higher levels nonetheless involves knowledge of underlying physical processors by guest operating systems or application programs in virtualized environments, which is often difficult or impossible. Moreover, the inherent delays and overheads involved in these computations, at the guest-operating-system or application-program levels, may render any such computed results inaccurate and unreliable. The current document, by contrast, includes computed processor events and approximated processor events within a virtualized PMU provided by the virtualization layer of a complex computing system. Virtual machine monitors execute directly above, or close to, the hardware level of physical processors, and are thus far better able to provide computed-event and approximated-event monitoring than higher-level performance tools.

Figure 23:
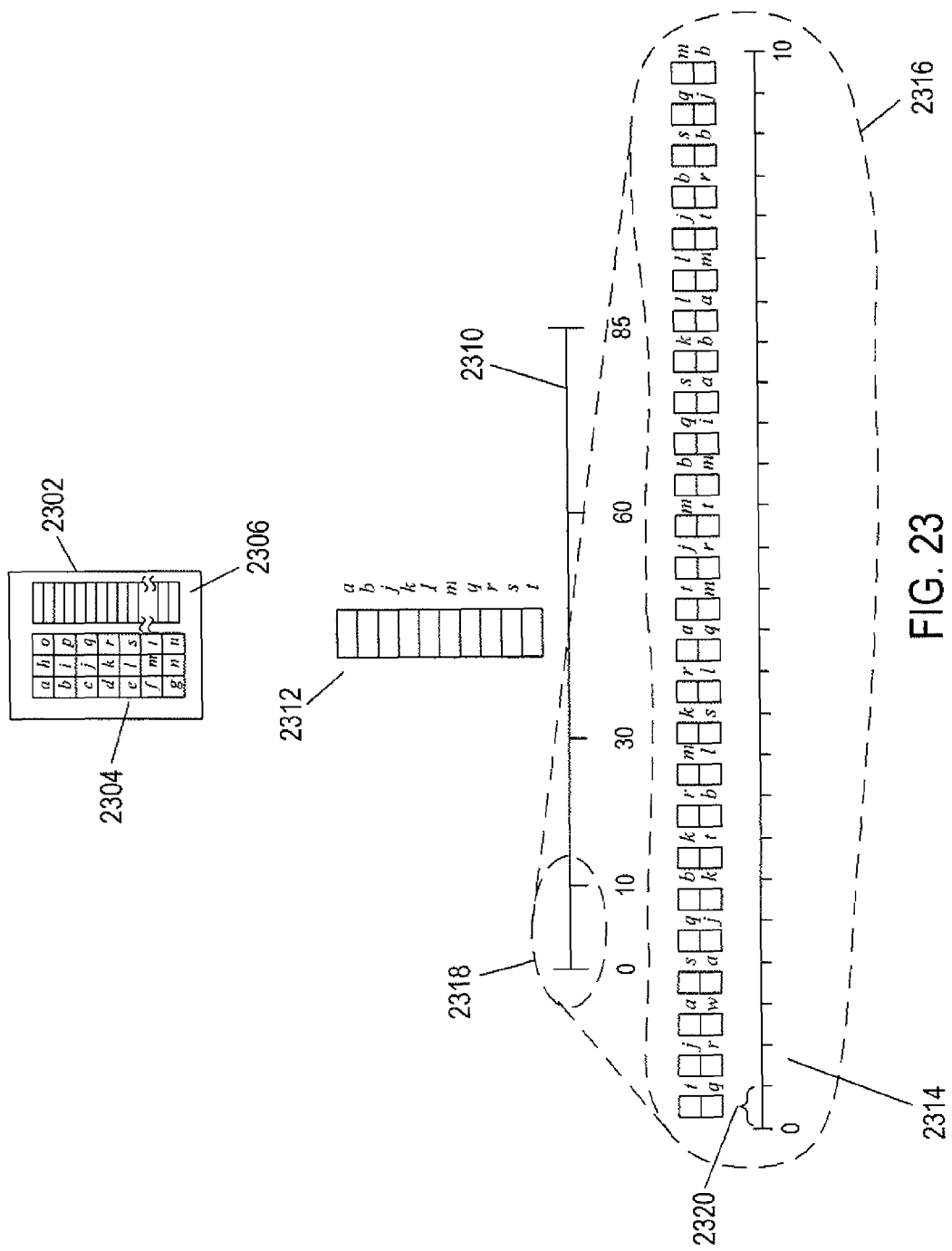
FIG. 23 illustrates a second method employed in hardware-decoupled virtualized PMU provision by virtualization layers.

FIG. 23 illustrates a second method employed in hardware-decoupled virtualized PMU provision by virtualization layers. As represented by rectangle 2302, a hardware-decoupled virtualized PMU interface may contain a very large number of different hardware-based, computed, and approximated events for monitoring 2304 and many virtualized PMU registers 2306. A large number of virtualized PMU registers can be obtained from a much smaller set of hardware PMU registers by time multiplexing of the hardware PMU registers. Time multiplexing of hardware PMU registers is illustrated in the lower portion of FIG. 23. As shown with reference to timeline 2310, the same timeline used repeatedly in FIG. 21, ten different processor events 2312 are continuously monitored, over the entire execution of the process discussed above with reference to FIGS. 20 and 21, using hardware-decoupled virtualized PMU registers 2312. This is possible, even though only two hardware PMU registers are used for collecting data. A lower, magnified timeline 2314, shown in the magnified expansion 2316 of inset 2318, illustrates how the two hardware PMU registers are employed to provide monitoring of the ten processor events by ten hardware-decoupled virtualized PMU registers 2312. The portion of the timeline 2310 between t=0 and t=10, shown as expanded timeline 2314, is further incremented into very small time intervals, such as time interval 2320. During each of these small time intervals, the hardware PMU registers are configured to collect data for two processor events. However, a different pair of processor events are monitored during each successive small time increment. Thus, although, at any given instance, only two processor events are being monitored by the two hardware PMU registers, over the entire interval, the occurrence of the ten processor events 2312 are sampled repeatedly over short time intervals. In certain cases, where absolute number of occurrences is desired, the collected data over the sampling intervals may be multiplied by a factor computed as the total monitoring time divided by the portion of the total monitoring time that each processor event is actually monitored. In other words, the collected data may be scaled upward to provide a relatively accurate estimate of the actual number of events. Because the small time intervals, such as small-time interval 2320, are very short in comparison to the total execution time of the process, and because the selection of processor events to monitor at any point is carried out by pseudo-random, but fair selection method, it is unlikely that the sampling intervals for a given processor event will synchronize with, or be correlated with, different phases of execution of a process or VM. As with the use of computed and approximated processor events, time multiplexing of hardware PMU registers is far more efficiently and effectively carried out by virtual machine monitors within a virtualization layer than by higher-level performance-monitoring tools, for which determining the types and numbers of underlying hardware PMUs may be difficult or infeasible.

Figure 24:
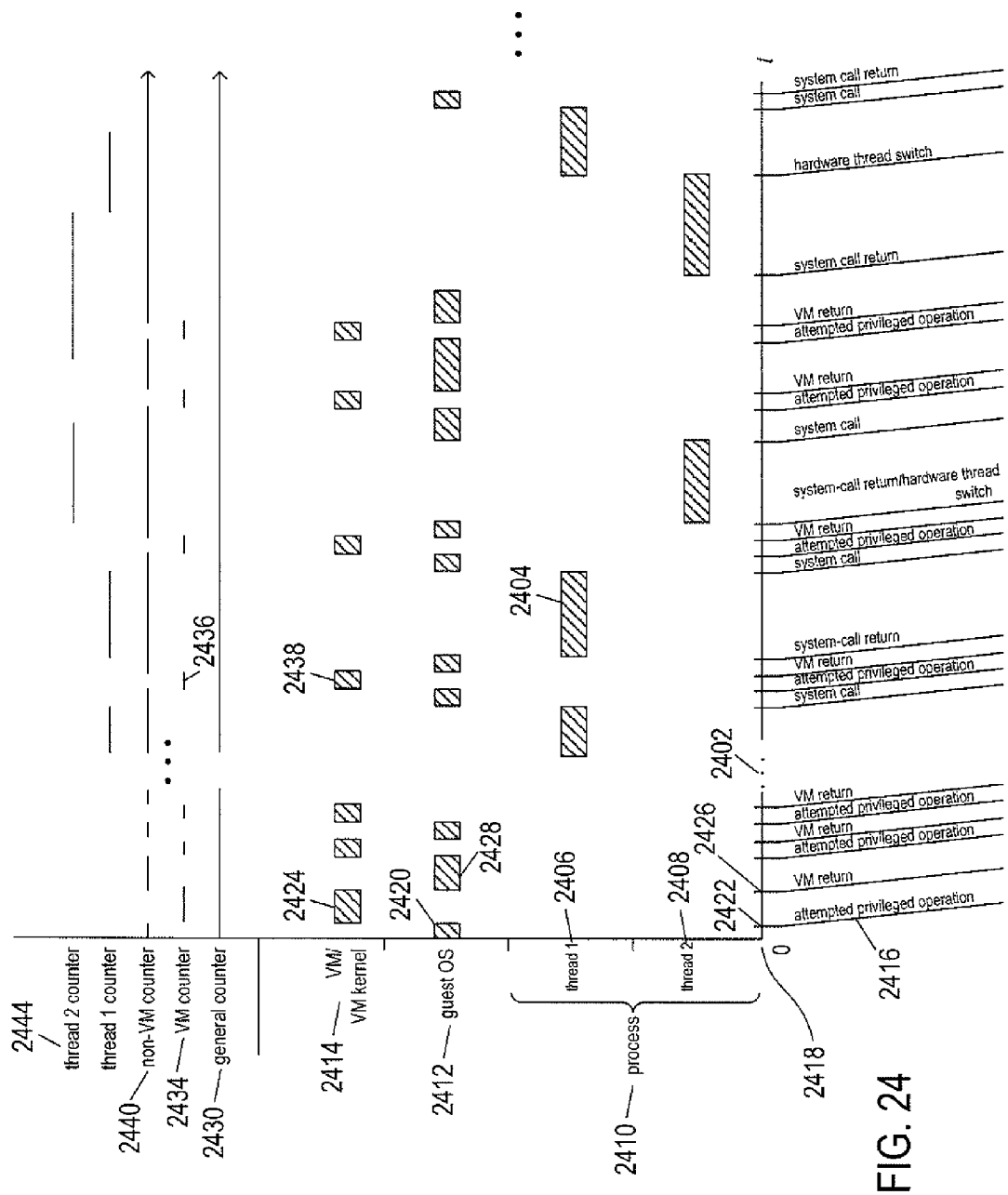
FIG. 24 illustrates a third method employed in implementing hardware-decoupled virtualized PMU interfaces.

FIG. 24 illustrates a third method employed in implementing hardware-decoupled virtualized PMU interfaces. FIG. 24 illustrates different types of counting modes that can be implemented for a given PMU counting register. These modes may be selected by flags within an event-selection register associated with a counting register or by other means. A timeline 2402 is provided at the bottom of a plot, in FIG. 24. Horizontal bars, such as horizontal bar 2404, represent durations of time during which instructions are executed, by the processor, on behalf of different entities within a hyper-threaded processor. These entities include a first thread 2406 and a second thread 2408 of a process 2410, a guest operating system 2412 above which the process executes, and VM and VM kernel components of a virtualization layer 2414 above which the guest operating system 2412 executes. Time-associated events are represented, in FIG. 24, along the timeline 2402, by annotated time-associated markings, such as annotated time-associated marking 2416. At time t=0 2418, the guest operating system is executing 2420. When the guest operating system attempts to execute a privileged instruction 2422, the virtualization layer executes 2424 in order to emulate execution of the privileged instruction. When the virtualization layer completes emulation of the privileged instruction 2426, the guest operating system resumes execution 2428. In the upper section of FIG. 24, the time intervals over which processor-event monitoring is carried out for different modes of monitoring are illustrated using timeline intervals. In a general counting mode 2430, the counting of a processor event by a hardware-decoupled PMU counter register is continuous 2432. In a virtualization-counting mode 2434, the counting of occurrences of a processor event occurs only while instructions are executed for the VM and VM kernel, such as during the time interval 2436 during which the VM or VM kernel executes 2438. An inverse non-VM counter mode 2440 monitors the occurrence of processor events when instructions are executed for all entities other than the VM/VM kernel. Two different thread-counting modes 2442 and 2444 count the occurrences of a processor event only during execution of instructions on behalf of specific threads. Nearly any conceivable virtualization-counting mode can be implemented from the virtualization layer, including virtualisation counting modes that monitor events during execution of virtualization-layer instructions, execution of virtual-machine instructions, execution of guest-operating-system instructions; execution of application-program instructions, execution of any of virtualization-layer instructions, virtual-machine instructions, guest-operating-system instructions, and application-program instructions, execution of any of virtualization-layer instructions, virtual-machine instructions, and guest-operating-system instructions, and execution of any of virtualization-layer instructions and virtual-machine instructions.

As discussed above with reference to FIG. 18, the difficulties in obtaining thread-specific event counts are even greater than the difficulty for non-hyper-threaded processors. Again, both for thread-specific counting modes and virtualization counting modes, a virtualization layer is far better positioned, within the hierarchy of computational entities within a complex computing system, to attempt to use computed and approximated events and time-multiplexed hardware PMU registers in order to provide an accurate understanding of the frequency of occurrence of processor events while various different entities are being executed. Thus, as with the first method discussed above with reference to FIGS. 22A-D and the second method discussed above with reference to FIG. 23, the third method of providing PMU-register modes for counting processor events during execution of various different executing entities is far more efficiently and effectively carried out at the virtualization level. The virtualization layer can use details the various types of methods used for sharing of hardware resources among hardware threads as well as any performance-monitoring support provided by the hardware PMUs in order to attempt to produce at least approximate thread-specific performance monitoring modes, while, at layers above the virtualization layer, thread-specific performance monitoring is generally not feasible.

Figure 25:
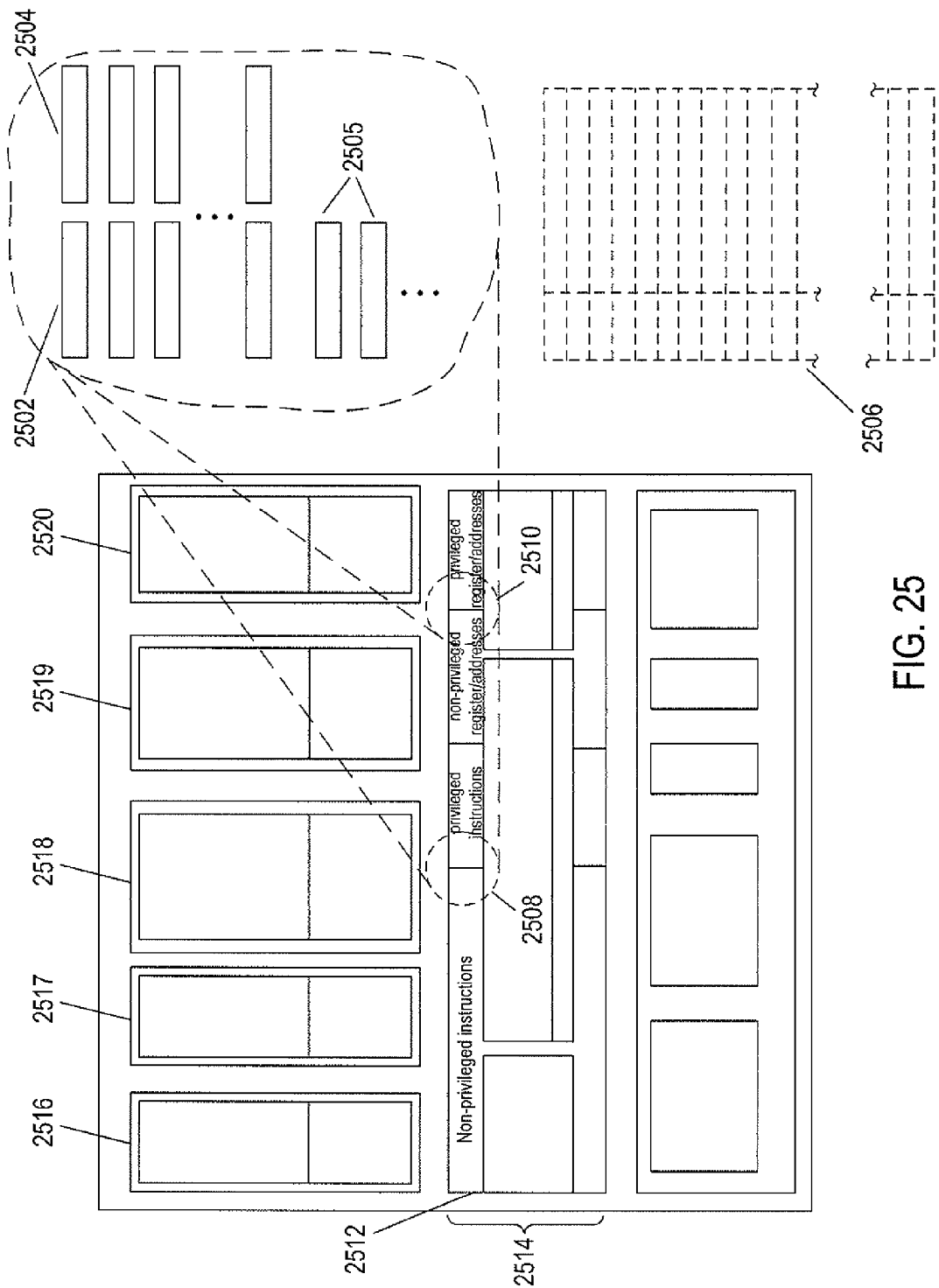
FIGS. 25-27D illustrate one implementation of a hardware-decoupled virtualized PMU interface.

FIGS. 25-27D illustrate one implementation of a hardware-decoupled virtualized PMU interface. FIG. 25 uses the same illustration conventions as used in FIG. 5A. FIG. 25 shows that the hardware-decoupled virtualized PMU interface, including counting registers 2502, event-selection registers 2504, PMU-register-access instructions 2505 and the implied hardware-decoupled PMU-interface event table 2506, are implemented as additional non-privileged instructions, privileged instructions, non-privileged registers, and privileged registers, within dashed circles 2508 and 2510, of the virtual-machine interface 2512 provided by the virtualization layer 2514 to guest operating systems and application programs running within virtual machines 2516-2520.

Figure 26:
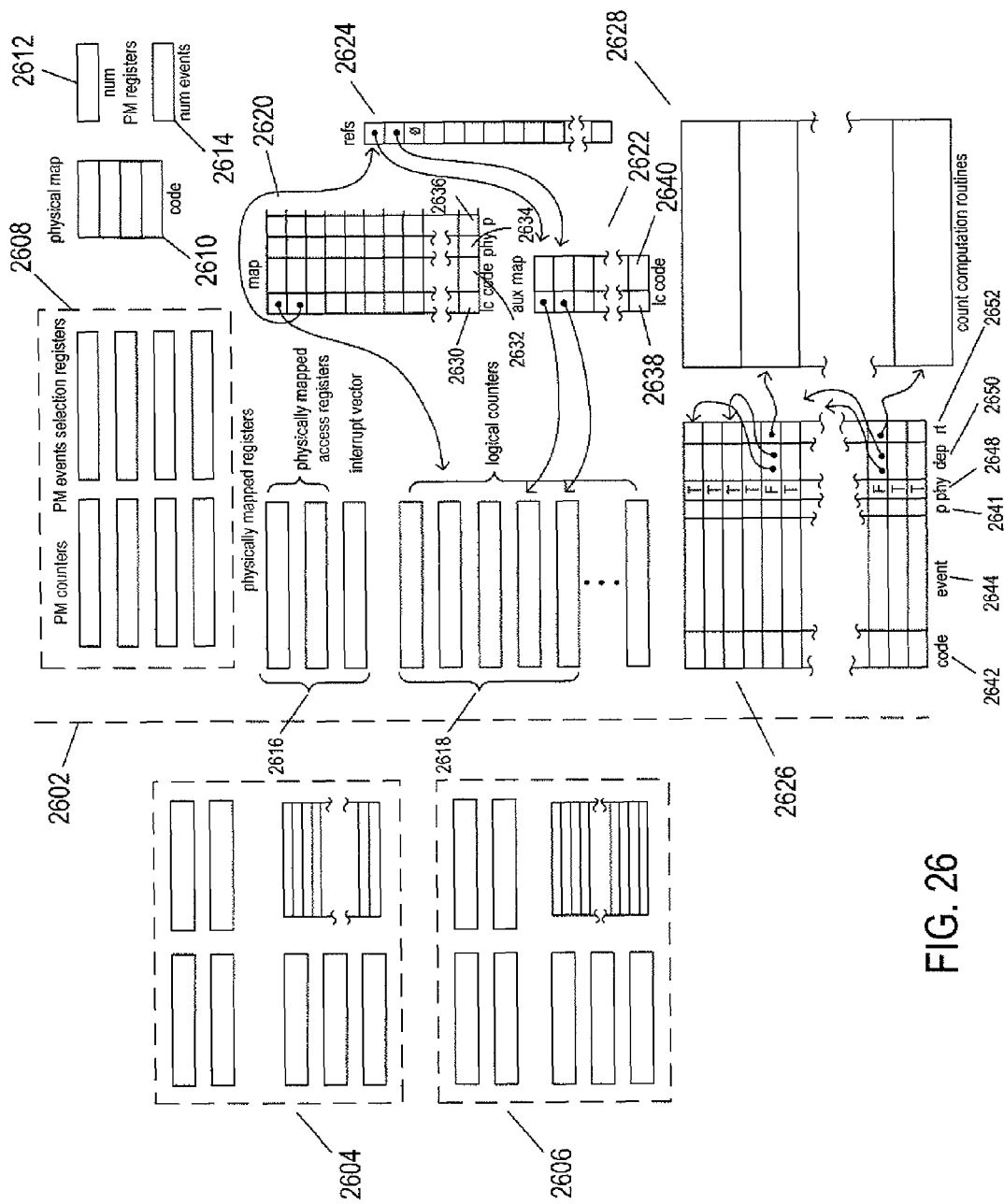

FIG. 26 shows components of one implementation of a hardware-decoupled virtualized PMU interface. Hardware components are shown to the left of a vertical dashed line 2602 in FIG. 26 and virtualization-layer components are shown to the right of the vertical dashed line 2602. The hardware components include the PMU interfaces 2604 and 2606 provided by underlying hardware processes. Only two of potentially many hardware PMU interfaces are shown in FIG. 26. The virtualization-layer components include logical, physically mapped PMU counter registers and PMU event-selection registers 2608, a physical map 2610 that associates event codes with pairs of logical physically mapped PMU registers, a logical register or memory address at which the number of hardware-decoupled PMU-register pairs is stored 2612, a virtual register or memory address in which an indication of the number of virtual processor events that can be monitored by the hardware-decoupled PMU interface is stored 2614, virtual access instructions, interrupt vector, and other PMU-interface entities 2616, a large set of logical counters 2618, a map 2620 that associates logical counters with hardware-decoupled virtualized PMU-register pairs and which further employs an auxiliary map 2622 and a refs array 2624, an event table 2626, and a set of count-computation routines 2628 that implement computed and approximated processor events. The physically mapped registers 2608 represent a set of PMU registers that are mapped to the PMU registers of a processor onto which a virtual machine is currently mapped for execution. The map 2620 represents the current, active set of hardware-decoupled PMU counter registers. These hardware-decoupled counter registers are implemented by time multiplexing of the physically mapped PMU registers 2608. Each entry in the map, represented by a row in the table-like illustration of the map, includes a pointer to either a single logical counter or to multiple pointers, stored in the refs array 2624, to multiple entries in the auxiliary map 2622, which, in turn, include references to multiple logical counters. The reference to the single or multiple logical counters is stored in an lc field 2630 of the map entry. Map entries also include a field that indicates the event code for the event currently monitored by a hardware-decoupled virtual PM register pair corresponding to the map entry 2632, an indication of whether the event is an event provided by the physical, underlying PMU interface 2634, and an indication of whether the hardware-decoupled virtualized PMU register is or is not protected 2636. Entries of the auxiliary map include a field that includes a reference to a logical counter 2638 and a field that includes an event code 2640. Each entry of the event table 2626 includes an event code 2642, the description of the event 2644, an indication of whether the event can be monitored by a protected virtualized PMU register 2646, an indication of whether or not the event is monitored by underlying physical PMU interfaces 2648, one or more pointers to dependent, physical events from which a computed or approximated event is calculated 2650, and a pointer, for computed or approximated events, to a corresponding count-computation routine 2652 that includes the logic to compute the computed or approximated event from the dependent physical counters. The contents of the virtualization-layer components may be changed when a virtual machine migrates from one processor to another. The described implementation assumes that a VM executes on only one processor at given instant in time. When a VM may execute on multiple processors, additional virtualization-layer components can be used, along with somewhat more complex logic, to provide a hardware-decoupled virtualized PMU interface that encompasses multiple underlying hardware processors.

Figure 27A:
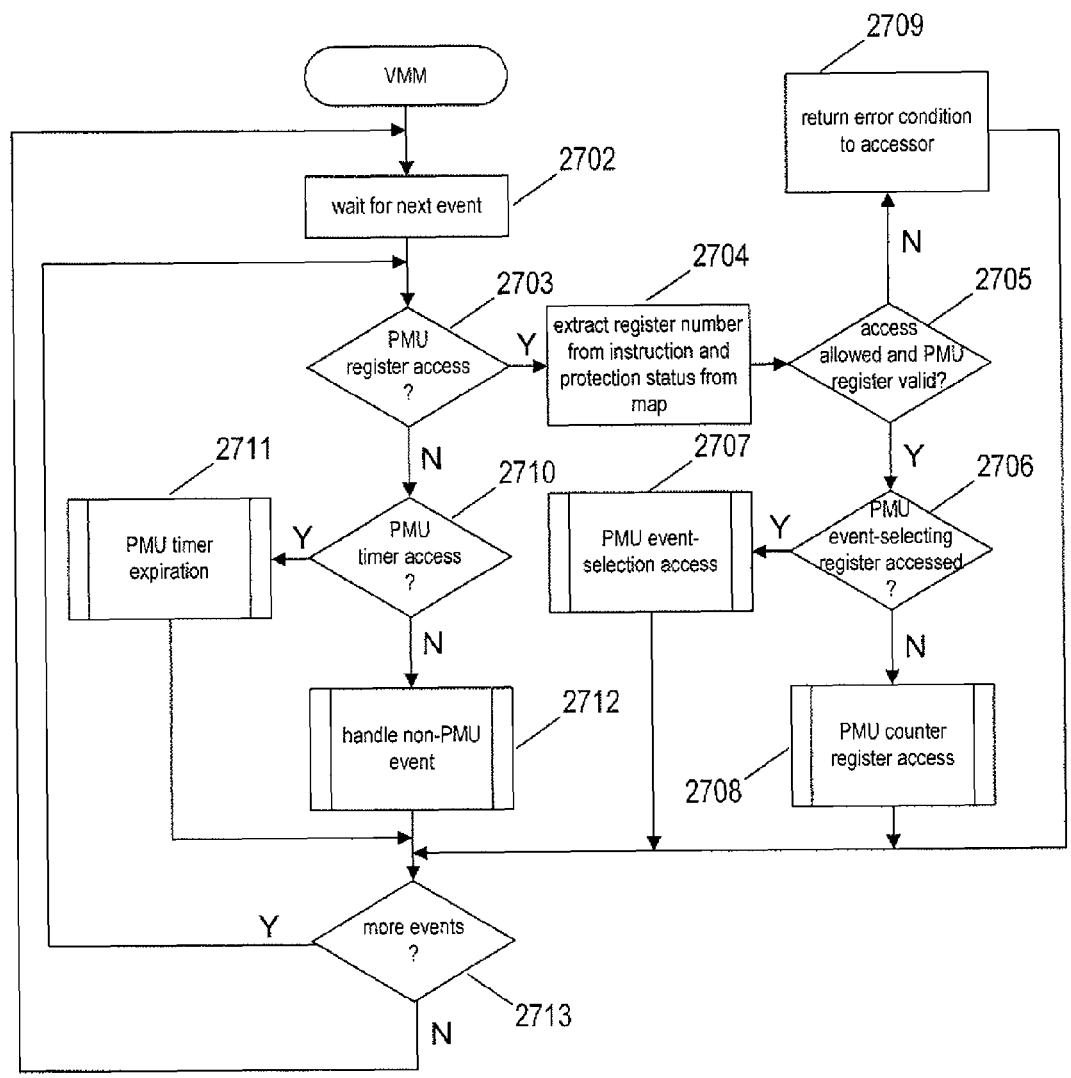

FIGS. 27A-D provide control-flow diagrams that describe implementation of a hardware-decoupled virtualized PMU interface based on the logical and physical components illustrated in FIG. 26. FIG. 27A provides a control-flow diagram for a virtual machine monitor that implements the hardware-decoupled virtualized PMU interface. In step 2702, the VMM waits for a next event to occur. These may be traditional events, such as hardware interrupts, instruction traps, and other such events, or may be attempts to execute privileged instructions or access privileged registers. When an event occurs, and the event is a PMU-register-access event, as determined in step 2703, then, in step 2704, a virtualized PMU register number is extracted from the PMU-register-access instruction and the protection status for the virtualized PMU register is obtained from the map (2620 in FIG. 26). When access to the virtualized PMU register is allowed for the accessing entity and when the PMU register is valid, as determined in step 2705, then, in step 2706, the VMM determines whether or not an event-selection register or a counter register is being accessed. In the event that an event-selection virtualized PMU register is being accessed, the routine PMU event-selection access is called, in step 2707. Otherwise, the routine PMU counter register access is called in step 2708. When access is not allowed to the entity or when the PMU register that is attempting to be accessed is invalid, then some type of error condition is returned or raised, in step 2709. When the event that has occurred is a PMU-timer-expiration event, as determined in step 2710, then the routine "PMU timer expiration" is called in step 2711. Otherwise, for all other types of events, a non-PMU-event handler is called in step 2712. When there are more events queued for processing, as determined in step 2713, then control returns to step 2703. Otherwise, control returns to step 2702, in which the VMM waits for a next event.

Figure 27B:
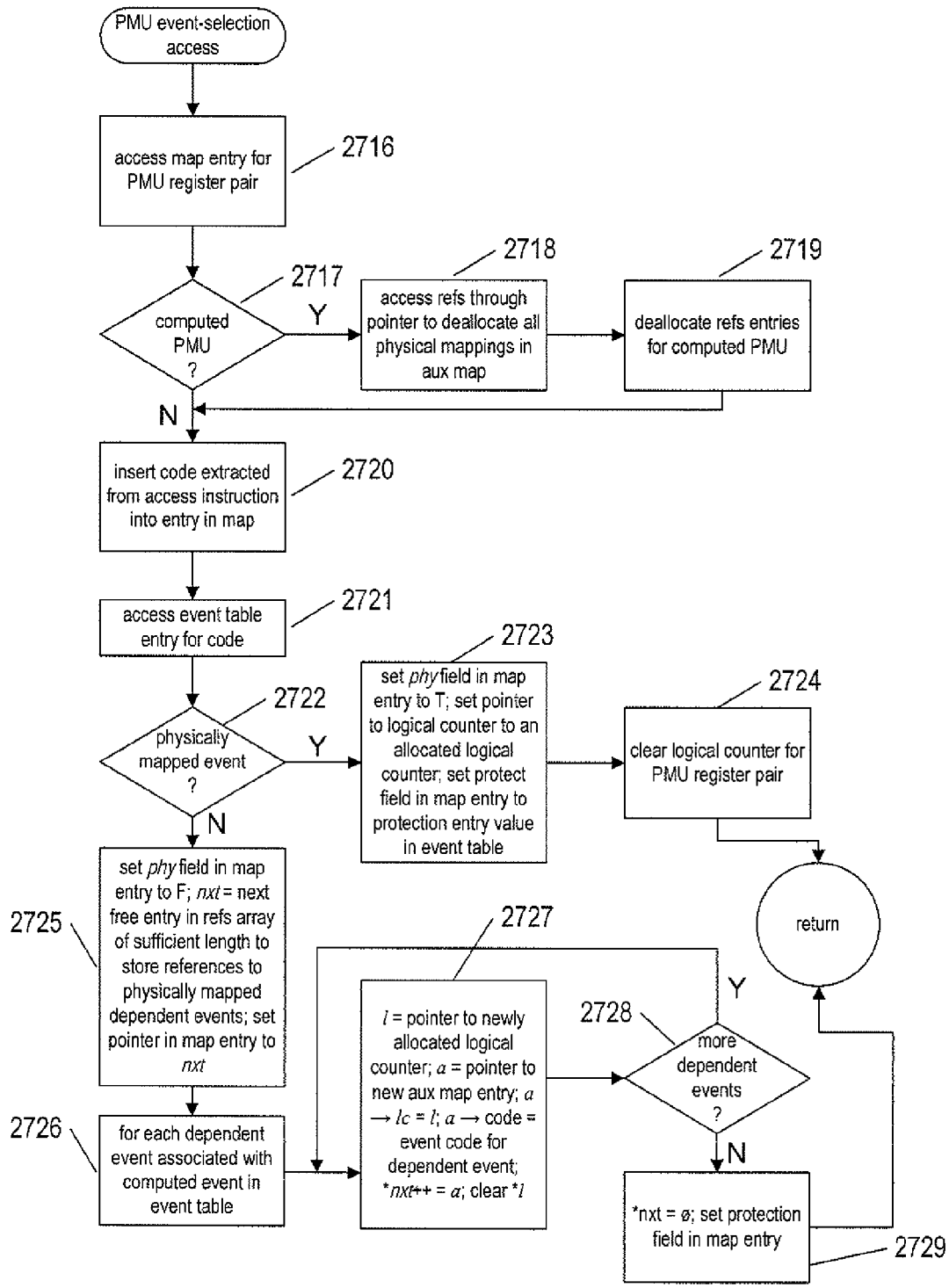

FIG. 27B provides a control-flow diagram for the routine "PMU event-selection access" called in step 2707 of FIG. 27A. In step 2716, the routine accesses the map (2620 in FIG. 26) and map entry for the virtualized PMU register pair represented by the map entry and indicated by the register number extracted from the access instruction in step 2704 of FIG. 27A. In FIG. 27B, access to a virtualized PMU event-selection register is assumed to be a write access. A read access to a virtualized PMU-event-selection register would simply return a reconstructed version of the virtualized PMU event-selection register based on information contained in the map (2620 in FIG. 26) and other logical components of the hardware-decoupled virtualized PMU interface. When the accessed virtualized PMU register pairs are currently counting a computed or approximated event, as determined in step 2717, then, in step 2718, the entry in the refs array (2624 in FIG. 26) that is referenced through the pointer in the map entry is accessed in order to deallocate all auxiliary map entries referenced from that refs entry. Then, in step 2719, the refs entry is also deallocated. These two steps essentially deallocate any logical counters that have been allocated to store counts from physical counters in order to compute counts for the accessed PMU registers that are currently counting a computed or approximated processor event. Next, in step 2720, the event code extracted from the event-selection write instruction is inserted into the map entry for the virtualized PMU register pair. In step 2721, the event-table (2626 in FIG. 26) entry for this code is accessed. When the processor event represented by the code is a processor event monitored by the underlying processor hardware, as determined in step 2722, then, in step 2723, the phy field in the map entry for the virtualized PMU register pair is set to true, the pointer in the map entry is set to reference a newly allocated logical counter, and the protection field of the map entry is set to the value of the protection field in the corresponding event-table entry. In step 2724, the logical counter for the virtualized PMU counter register of the virtualized PMU register pair is cleared. When the event to be monitored is not monitored by the underlying physical PMU hardware, as determined in step 2722, then the phy field in the map entry is set to false, in step 2725, and, in steps 2725 and the steps of the for-loop of steps 2726-2728, an entry in the refs array is allocated and logical pointers are inserted into this refs-array entry to point to newly allocated entries in the auxiliary map (2622 in FIG. 26) which, in turn, include references to newly allocated logical counters associated with the virtualized PMU-register pair. Event codes for the hardware-monitored dependent events that are used to compute the computed or approximated event counts are inserted in the code fields of the auxiliary map entries referenced from the entry in the refs array for the virtualized PMU-register pair. Finally, in step 2729, the protection field in the map entry for the virtualized PMU-register pair is set to the corresponding value for the entry of the event to be monitored in the events table (2626 in FIG. 26).

Figure 27C:
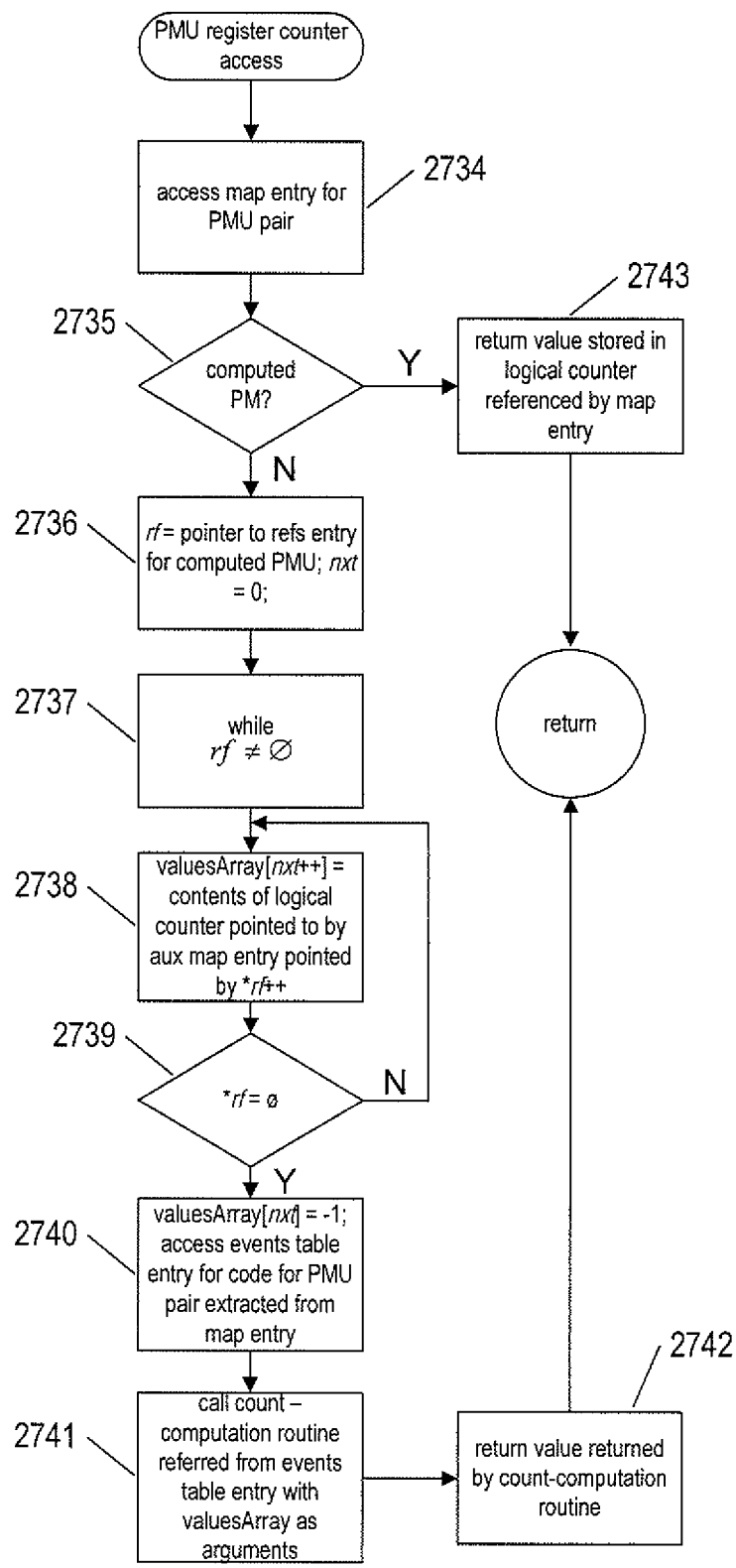

FIG. 27C provides a control-flow diagram that illustrates implementation of the routine "PMU register counter access" called in step 2708 of FIG. 27A. This implementation assumes that a read access is made to a virtualized PMU counter register. A write access would involve entering a numerical value into a logical counter associated with the virtualized PMU counter register. In step 2734, the routine accesses the map (2620 in FIG. 26) entry for the virtualized PMU register pair indicated by the register number extracted from the access instruction in step 2704 of FIG. 27A. When the virtualized PMU counter register is counting a computed or approximated event, as determined in step 2735, then, in step 2736, a local variable rf is set to point to the refs entry referenced by the map entry for the virtualized PMU counter register and the local variable nxt is set to 0. Then, in the while-loop of steps 2737-2739, the values stored in all the logical counters associated with the virtualized PMU counter register through the refs entry pointed to by local variable rf are extracted from the logical counters and stored in a local array valuesArray. In step 2740, the events table entry for the event code associated with the virtualized PMU counter register is accessed in order to extract a reference to the count-computation routine associated with the code. The count-computation routine is called, in step 2741, to compute a current count value for the virtualized PMU count register based on the count values for the physically monitored events on which the computed or approximated event depends, and the computed value is returned, in step 2742.

When the virtualized PMU counter register is currently counting a physically monitored processor event, as determined in step 2735, then the count stored in the logical counter associated with the virtualized PMU counter register, obtained from the map entry for the virtualized PMU counter register, is returned in step 2743.

Figure 27D:
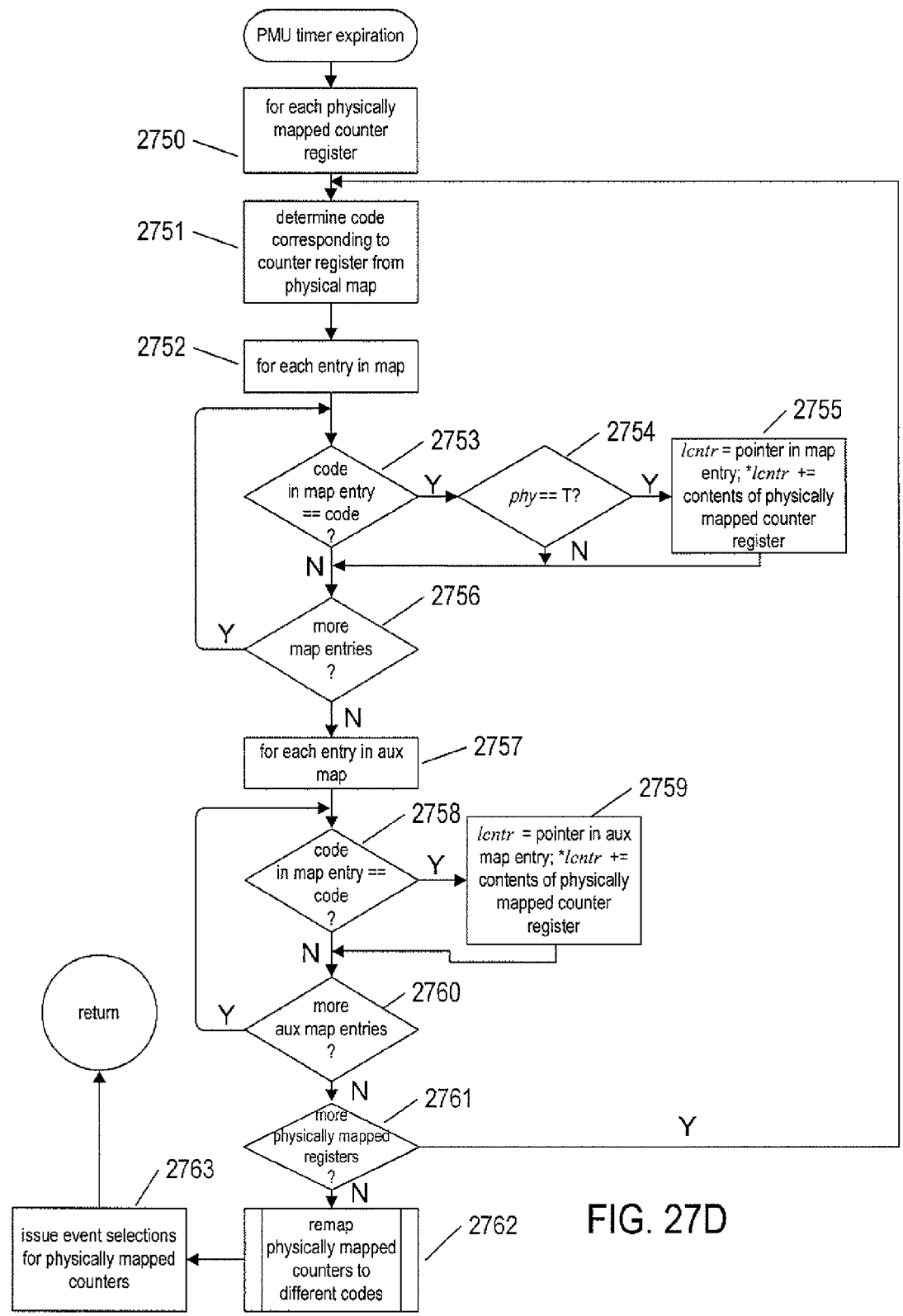

FIG. 27D provides a control-flow diagram for the routine "PM timer expiration" called in step 2711 of FIG. 27A. In the for-loop of steps 2750-2760, each physically mapped counter register within the physically mapped registers (2608 in FIG. 26) is considered. In step 2751, the event code corresponding to the physically mapped counter register is obtained from the physical map (2610 in FIG. 26). In the inner for-loop of steps 2752-2755, each entry in the map (2620 in FIG. 26) is considered. When the event code in the currently considered map entry is equal to the code corresponding to the currently considered counter register, as determined in step 2753, and when the pointer in the map entry points to a logical counter, since the map entry describes an event code that is physically counted, as determined in step 2754, then, in step 2755, the current contents of the physically mapped counter register are added to the contents of the logical counter associated with the map entry. Then, in the inner for-loop of steps 2757-2760, each entry in the auxiliary map (2622 in FIG. 26) is considered. When the event code in the auxiliary-map entry is equal to the event code for the currently considered physically mapped counter register, as determined in step 2758, then, in step 2759, the contents of the currently considered physically mapped counter register are added to the contents of the logical counter associated with the currently considered auxiliary-map entry. Thus, the counted values in the physically mapped counter registers are added to those logical counters corresponding to events monitored by the physically mapped counter registers. In step 2762, the physically mapped registers are then re-mapped in order to monitor different events. The remapping is discussed above, with reference to FIG. 23. In general, remapping is carried out using a pseudo-random, but fair selection process to ensure that all of the currently monitored events are physically monitored for an adequate number of short time intervals. Finally, in step 2763, the re-mapping is implemented at the hardware level by writing to the hardware event-selection registers corresponding to the physically mapped PMU counter registers. Note that the timer used to control time multiplexing may not be a traditional OS-like timer, but may instead involve virtualization-layer features and techniques for carrying out a task at regular intervals.

In the described implementation, it is assumed that time multiplexing is always carried out, regardless of the number of virtualized PMU registers that have been configured for current monitoring. In alternative implementations, when the number of virtualized PMU registers that are currently configured to count events is less than or equal to the number of physically mapped PMU registers, time multiplexing carried out by the logic discussed above with reference to FIG. 27D may be discontinued, since there are adequate underlying physical PMU registers to carry out continuous monitoring for all selected events. The set of physically mapped registers (2608) represents a mapping that can be changed, by the VMM, when a VM migrates from one processor to another, including migrations between processors of multi-processor servers as well as migrations from one server to another within a virtual data center or larger virtual computational system.

Hardware-decoupled virtualized PMU interfaces enable performance monitoring tools to monitor the performance of processes executing within execution environments provided by virtual machines as the processes and virtual machines migrate among processors within multi-processor systems as well as among multi-processor systems within virtual data centers and larger computational systems. Performance-monitoring tools and utilities are able to access a uniform virtualized PMU interface without needing to determine the types of processors on which monitored processes and virtual machines are executed and without attempting to compute count values for computed and approximated processor events. Because the data collection and computations are carried out within the virtualization layer, and therefore much closer to the underlying hardware, far more efficient and accurate event-occurrence accounts are obtained for computed and approximated events.

Although the present invention has been described in terms of particular embodiments, it is not intended that the invention be limited to these embodiments. Modifications within the spirit of the invention will be apparent to those skilled in the art. For example, any of many different design and implementation parameters, including hardware platforms, virtualization layers, modular organizations, control structures, data structures, and other such design and implementation parameters can be varied to produce many different implementations of hardware-decoupled virtualized PMU interfaces. The virtualized PMU interfaces may provide any of a variety of different types of PMU registers, access instructions, and monitored events.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A virtualization, layer comprising computer instructions, stored in a memory within a virtualized computer system that includes one or more processors, one or more memories, and one or more physical data-storage devices, that, when executed by one or more of the one or more processors, control the virtualized computer system to:
   provide a virtual hardware interface to one or more virtual machines that each includes a guest operating system and one or more application programs that execute within an execution environment provided by the guest operating system; and
   provide, as a component of the virtual hardware interface, a set of virtual performance monitoring registers that can be accessed by the one or more of the guest operating systems and that differ in one or more of number and function from the hardware-level performance monitoring registers provided by any one of the one or more processors;
   wherein the virtualization layer provides a virtual performance monitoring register that counts the occurrence of a specified type of event over a monitoring time interval by:
   time multiplexing a hardware-level performance monitoring register in order to collect and accumulate counts of the occurrences of the specified type of event from the hardware-level performance monitoring register during multiple time intervals each shorter than the monitoring time interval and that together represent a total accumulated time less than the monitoring time interval.

2. The virtualization layer of claim 1 wherein the virtualization layer provides a virtual performance monitoring register that counts the occurrences of a specified type of event over a monitoring time interval by:
computing, from the values provided by one or more hardware-level performance monitoring registers, a count of the occurrence of the specified type of event.

3. The virtualization layer of claim 1 wherein the virtualization layer provides a virtual performance monitoring register that counts the occurrences of a specified type of event over a monitoring time interval by:
computing, from the values provided by one or more hardware-level performance monitoring registers, an estimation of the count of the occurrence of the specified type of event.

4. The virtualization layer of claim 1 wherein the virtualization layer provides a virtual performance monitoring register that counts the occurrences of a specified type of event over a monitoring time interval according to a selectable monitoring mode, selected from among modes that specify counting of the occurrences of the specified type of event under specific operational characteristics of a processor and a virtual machine executed by the processor.

5. The virtualization layer of claim 4 wherein the specific operational characteristics of a processor and a virtual machine executed by the processor include:
current execution of the virtual machine on a particular hardware thread;
current execution of virtualization-layer instructions;
current execution of virtual-machine instructions;
current execution of guest-operating-system instructions;
current execution of application-program instructions;
current execution of any of virtualization-layer instructions, virtual-machine instructions, guest-operating-system instructions, and application-program instructions;
current execution of any of virtualization-layer instructions, virtual-machine instructions, and guest-operating-system instructions; and
current execution of any of virtualization-layer instructions and virtual-machine instructions.

6. The virtualization layer of claim 1 wherein the virtualization layer further comprises virtualization-layer components that include logical, physically mapped performance monitoring counter registers that each stores accumulated counts for a specific type of events and performance monitoring event-selection registers that each, when written with an event type, selects for accumulation of counts for the written event type in a corresponding performance monitoring counter register.

7. The virtualization layer of claim 1 wherein the virtualization layer further comprises virtualization-layer components that include virtual access instructions and virtual interrupt vectors.

8. The virtualization layer of claim 1 wherein the virtualization layer further comprises virtualization-layer components that include logical counters that store accumulated counts of the occurrences of virtual event types, the accumulated counts of the occurrences of virtual event types computed exactly or estimated from accumulated counts of events stored in logical, physically mapped performance monitoring counter registers.

9. The virtualization layer of claim 1 wherein the virtualization layer further comprises virtualization-layer components that include a map, each entry of which associates a logical counter with a logical, physically mapped performance monitoring counter register.

10. The virtualization layer of claim 1 wherein the virtualization layer further comprises virtualization-layer components that include an event table, each entry of which includes an event code, an indication of whether or not the event is monitored by a hardware-level performance monitoring counter, and a pointer, for computed and approximated events, to a corresponding count-computation that includes the logic to compute the computed or approximated event.

11. A method for monitoring processor events within a virtualized computer system that includes one or more processors, one or more memories, one or more physical data-storage devices, and a virtualization layer that provides a virtual hardware interface to one or more virtual machines that each includes a guest operating system and one or more application programs that execute within an execution environment provided by the guest operating system, the method comprising:
providing, as a component of the virtual hardware interface, a set of virtual performance monitoring registers that can be accessed by the one or more of the guest operating systems and that differ in one or more of number or and function from the hardware-level performance monitoring registers provided by any one of the one or more processors; and
using the virtual performance monitoring registers to accumulate counts of events that can be interpreted by performance monitoring tools which display performance monitoring data and graphical representations to human users, the events selected from among events that include virtual events and hardware-level-monitored events;
wherein the virtualization layer provides a virtual performance monitoring register that counts the occurrence of a specified type of virtual event over a monitoring time interval by:
time multiplexing a hardware-level performance monitoring register in order to collect and accumulate counts of the occurrences of the specified type of virtual event from the hardware-level performance monitoring register during multiple time intervals each shorter than the monitoring time interval and that together represent a total accumulated time less than the monitoring time interval.

12. The method of claim 11 wherein the virtualization layer provides a virtual performance monitoring register that counts the occurrences of a specified type of virtual event over a monitoring time interval by:
computing, from the values provided by one or more hardware-level performance monitoring registers, a count of the occurrence of the specified type of virtual event.

13. The method of claim 11 wherein the virtualization layer provides a virtual performance monitoring register that counts the occurrences of a specified type of virtual event over a monitoring time interval by:
computing, from the values provided by one or more hardware-level performance monitoring registers, an estimation of the count of the occurrence of the specified type of virtual event.

14. The method of claim 11 wherein the virtualization layer provides a virtual performance monitoring register that counts the occurrences of a specified type of virtual event over a monitoring time interval according to a selectable monitoring mode, selected from among modes that specify counting of the occurrences of the specified type of event under specific operational characteristics of a processor and a virtual machine executed by the processor.

15. The method of claim 14 wherein the specific operational characteristics of the processor and the virtual machine executed by the processor include:
   current execution of the virtual machine on a particular hardware thread;
   current execution of virtualization-layer instructions;
   current execution of virtual-machine instructions;
   current execution of guest-operating-system instructions;
   current execution of application-program instructions;
   current execution of any of virtualization-layer instructions, virtual-machine instructions, guest-operating-system instructions, and application-program instructions;
   current execution of any of virtualization-layer instructions, virtual-machine instructions, and guest-operating-system instructions; and
   current execution of any of virtualization-layer instructions and virtual-machine instructions.

16. Computer instructions stored in a memory that, when executed by a physical processor, monitor processor events, within a virtualized computer system that includes one or more processors, one or more memories, one or more physical data-storage devices, and a virtualization layer that provides a virtual hardware interface to one or more virtual machines that each includes a guest operating system and one or more application programs that execute within an execution environment provided by the guest operating system, by:
   providing, as a component of the virtual hardware interface, a set of virtual performance monitoring registers that can be accessed by the one or more of the guest operating systems and differ in one or more of number m and function to from the hardware-level performance monitoring registers provided by any one of the one or more processors; and
   using the virtual performance monitoring registers to accumulate counts of events that can be interpreted by performance monitoring tools which display performance monitoring data and graphical representations to human users, the events selected from among events that include virtual events and hardware-level-monitored events;
   wherein the virtualization layer provides a virtual performance monitoring register that counts the occurrence of a specified type of virtual event over a monitoring time interval by:
   time multiplexing a hardware-level performance monitoring register in order to collect and accumulate counts of the occurrences of the specified type of virtual event from the hardware-level performance monitoring register during multiple time intervals each shorter than the monitoring time interval and that together represent a total accumulated time less than the monitoring time interval.

17. The computer instructions of claim 16 wherein the virtualization layer provides a virtual performance monitoring register that counts the occurrences of a specified type of virtual event over a monitoring time interval by:
   computing, from the values provided by one or more hardware-level performance monitoring registers, a count of the occurrence of the specified type of virtual event.

18. The computer instructions of claim 16 wherein the virtualization layer provides a virtual performance monitoring register that counts the occurrences of a specified type of virtual event over a monitoring time interval by:
   computing, from the values provided by one or more hardware-level performance monitoring registers, an estimation of the count of the occurrence of the specified type of virtual event.

19. The computer instructions of claim 16 wherein the virtualization layer further comprises virtualization-layer components that include logical, physically mapped performance monitoring counter registers that each stores accumulated counts for a specific type of events and performance monitoring event-selection registers that each, when written with an anent type, selects for accumulation of counts for the written event type in a corresponding performance monitoring counter register.

20. The computer instructions of claim 19 wherein the specific operational characteristics of the processor and the virtual machine executed by the processor include:
   current execution of the virtual machine on a particular hardware thread;
   current execution of virtualization-layer instructions;
   current execution of virtual-machine instructions;
   current execution of guest-operating-system instructions;
   current execution of application-program instructions;
   current execution of any of virtualization-layer instructions, virtual-machine instructions, guest-operating-system instructions, and application-program instructions;
   current execution of any of virtualization-layer instructions, virtual-machine instructions, and guest-operating-system instructions; and
   current execution of any of virtualization-layer instructions and virtual-machine instructions.

* * * * *